(12) United States Patent
Tseng et al.

(10) Patent No.: US 11,575,813 B2
(45) Date of Patent: Feb. 7, 2023

(54) IMAGING LENS DRIVING MODULE, CAMERA MODULE AND ELECTRONIC DEVICE

(71) Applicant: LARGAN DIGITAL CO., LTD., Taichung (TW)

(72) Inventors: Te-Sheng Tseng, Taichung (TW); Heng Yi Su, Taichung (TW); Ming-Ta Chou, Taichung (TW); Wen-Hung Hsu, Taichung (TW)

(73) Assignee: LARGAN DIGITAL CO., LTD., Taichung (TW)

( * ) Notice: Subject to any disclaimer, the term of this patent is extended or adjusted under 35 U.S.C. 154(b) by 0 days.

(21) Appl. No.: 17/398,348

(22) Filed: Aug. 10, 2021

(65) Prior Publication Data

US 2022/0303438 A1   Sep. 22, 2022

Related U.S. Application Data

(60) Provisional application No. 63/163,606, filed on Mar. 19, 2021.

(51) Int. Cl.
*H04N 5/225* (2006.01)
*G02B 7/09* (2021.01)

(52) U.S. Cl.
CPC ............ *H04N 5/2254* (2013.01); *G02B 7/09* (2013.01); *H04N 5/2253* (2013.01)

(58) Field of Classification Search
CPC ....... H04N 5/2254; H04N 5/2253; G02B 7/09
See application file for complete search history.

(56) References Cited

U.S. PATENT DOCUMENTS

| | | | |
|---|---|---|---|
| 7,978,421 B2 | 7/2011 | Im et al. | |
| 8,995,068 B2 | 3/2015 | Baik et al. | |
| 9,197,802 B2 | 11/2015 | Kwon et al. | |
| 2013/0114949 A1* | 5/2013 | Koh | G02B 7/102 359/825 |
| 2013/0194491 A1* | 8/2013 | Kudo | G02B 7/08 359/814 |
| 2018/0031858 A1* | 2/2018 | Gomyo | G03B 3/10 |

FOREIGN PATENT DOCUMENTS

TW   201908846 A   3/2019

OTHER PUBLICATIONS

TW Office Action dated Jan. 25, 2022 as received in Application No. 110116170.

* cited by examiner

*Primary Examiner* — Mekonnen D Dagnew
(74) *Attorney, Agent, or Firm* — Maschoff Brennan

(57) ABSTRACT

An imaging lens driving module includes a lens carrier, a frame element, a driving mechanism and a metal conductive element. The lens carrier is disposed in the frame element. The driving mechanism includes a metal elastic element, a coil and a magnet assembly. The metal elastic element includes an outer fixing part coupled to the frame element, an inner fixing part coupled to the lens carrier, and an elastic part. The coil is fixed to the lens carrier and disposed corresponding to the magnet assembly. The metal conductive element is coupled to the lens carrier. The metal elastic element further includes an electrically connecting part and a compensating elastic part. The metal conductive element has a corresponsive surface corresponding to and electrically connected to the electrically connecting part. The compensating elastic part is connected to the electrically connecting part and the inner fixing part.

13 Claims, 49 Drawing Sheets

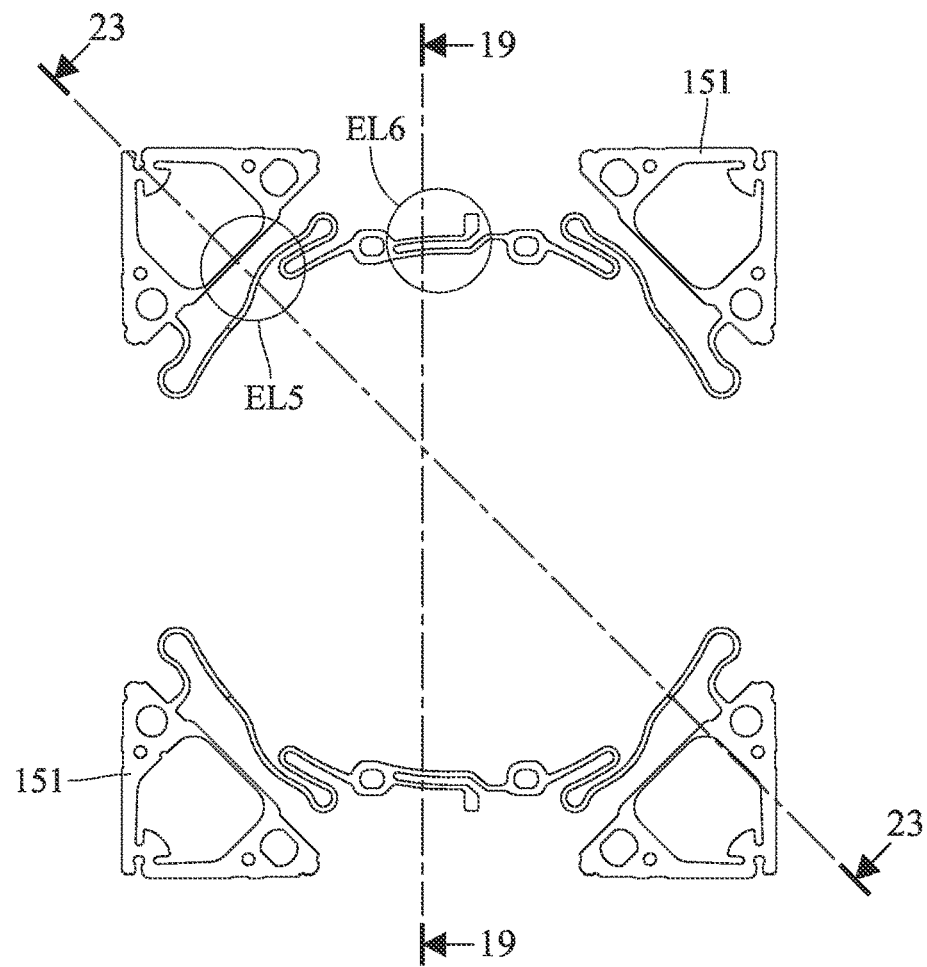
FIG. 16
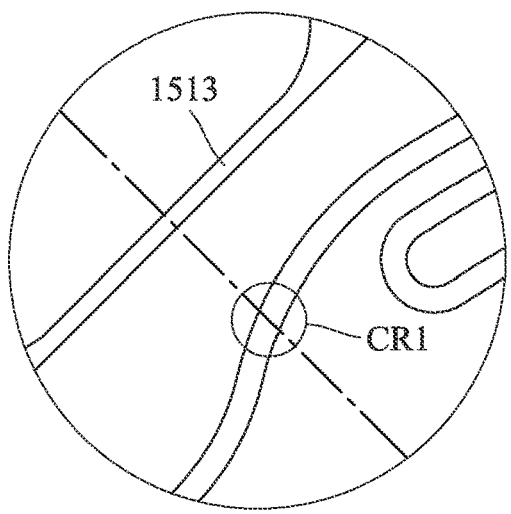
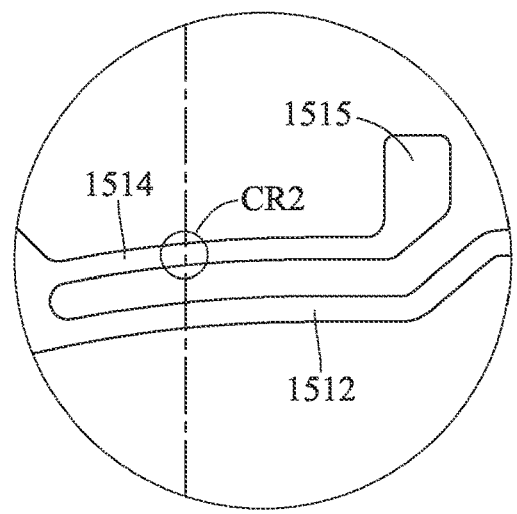
FIG. 17    FIG. 18

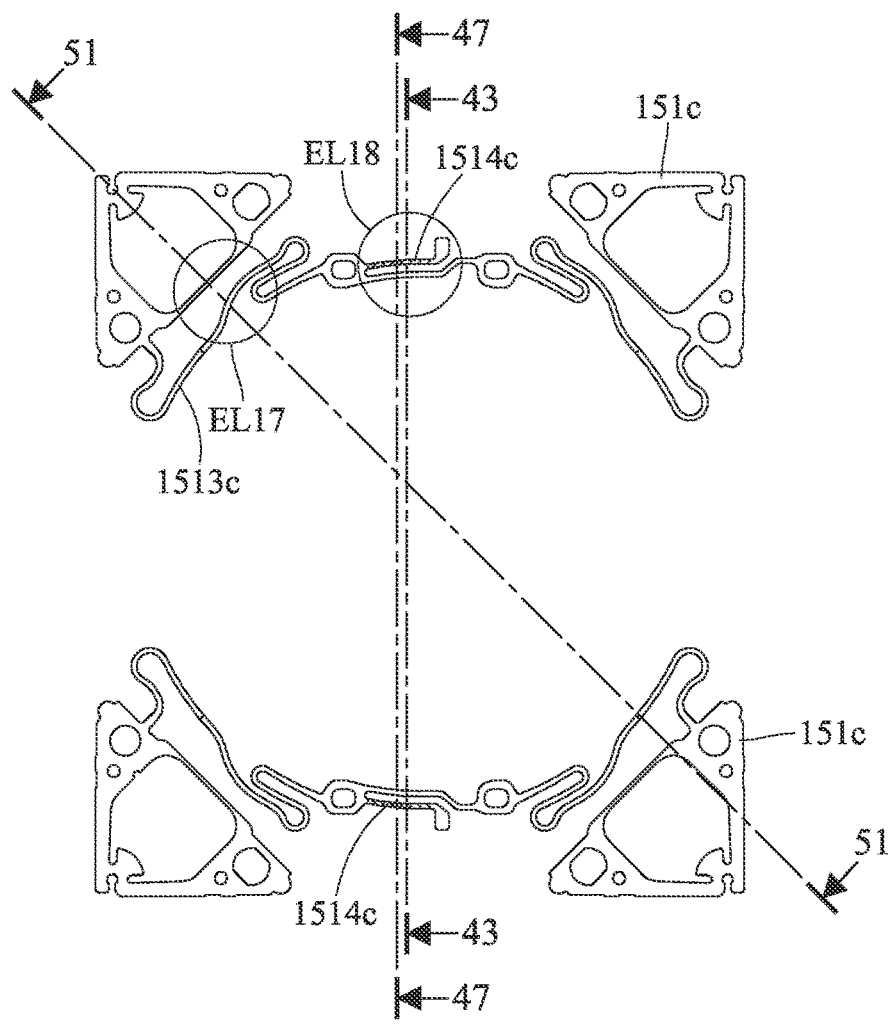
FIG. 40
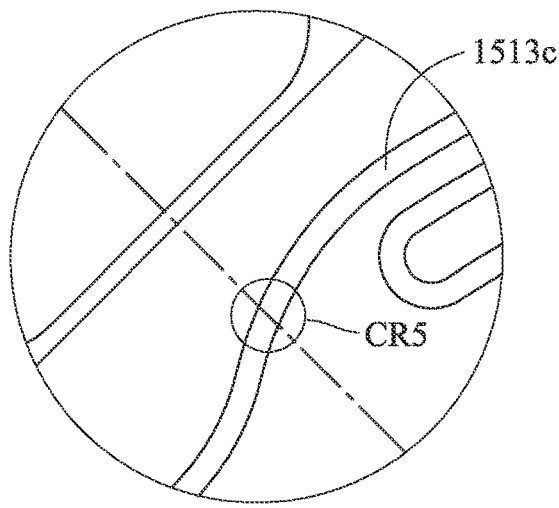
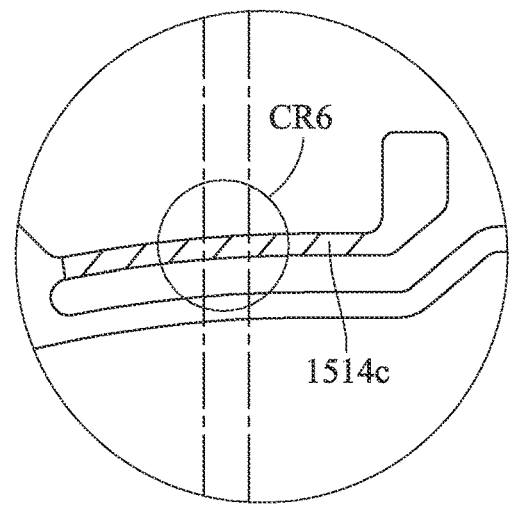
FIG. 41   FIG. 42

IMAGING LENS DRIVING MODULE, CAMERA MODULE AND ELECTRONIC DEVICE

RELATED APPLICATIONS

This application claims priority to U.S. Provisional Application 63/163,606, filed on Mar. 19, 2021, which is incorporated by reference herein in its entirety.

BACKGROUND

Technical Field

The present disclosure relates to an imaging lens driving module, a camera module and an electronic device, more particularly to an imaging lens driving module and a camera module applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays. Furthermore, due to the rapid changes in technology, electronic devices equipped with optical systems are trending towards multi-functionality for various applications, and therefore the functionality requirements for the optical systems have been increasing.

In recent years, there is an increasing demand for electronic devices featuring compact size, but conventional optical systems are difficult to meet both the requirements of high image quality and compactness. Conventional camera modules usually have functionalities such as auto focus, optical image stabilization and optical zoom. However, in order to achieve the above functionalities, the structure of the camera modules becomes more complex and the size thereof also increases, and thus, the size of electronic devices equipped with the camera modules also increases. In addition, in order to achieve auto focus and optical zoom functionalities, the camera modules are usually provided with lens driving units so as to drive the lens system to move along the optical axis. However, in conventional lens driving units, there are usually larger assembly errors between elastic elements and movable lens carriers, and there is usually a problem of assembly warpage so that the elastic elements may be installed unevenly and thus tilts, thereby increasing defective rate of the lens driving units.

SUMMARY

According to one aspect of the present disclosure, an imaging lens driving module includes a lens carrier, a frame element, a driving mechanism and a metal conductive element. The lens carrier is configured for holding an imaging lens system. The frame element forms an interior space for the lens carrier to be disposed therein. The driving mechanism is configured for driving the lens carrier to move in a direction parallel to an optical axis of the imaging lens system. The driving mechanism includes a metal elastic element, a coil and a magnet assembly. The metal elastic element includes an outer fixing part, an inner fixing part and an elastic part. The outer fixing part is coupled to the frame element, the inner fixing part is located closer to the lens carrier than the outer fixing part to the lens carrier and the inner fixing part is coupled to the lens carrier, and the elastic part is connected to the outer fixing part and the inner fixing part. The coil is fixed to the lens carrier, and the magnet assembly is disposed corresponding to the coil. The metal conductive element is coupled to the lens carrier. Additionally, the metal elastic element further includes an electrically connecting part and a compensating elastic part. The metal conductive element has a corresponsive surface disposed corresponding to and electrically connected to the electrically connecting part. The compensating elastic part is connected to the electrically connecting part and the inner fixing part.

According to another aspect of the present disclosure, an imaging lens driving module includes a lens carrier, a frame element, a driving mechanism and a metal conductive element. The lens carrier is configured for holding an imaging lens system. The frame element forms an interior space for the lens carrier to be disposed therein. The driving mechanism is configured for driving the lens carrier to move in a direction parallel to an optical axis of the imaging lens system. The driving mechanism includes a metal elastic element, a coil and a magnet assembly. The metal elastic element includes an outer fixing part, an inner fixing part and an elastic part. The outer fixing part is coupled to the frame element, the inner fixing part is located closer to the lens carrier than the outer fixing part to the lens carrier and the inner fixing part is coupled to the lens carrier, and the elastic part is connected to the outer fixing part and the inner fixing part. The coil is fixed to the lens carrier, and the magnet assembly is disposed corresponding to the coil. The metal conductive element is coupled to the lens carrier. Additionally, the metal conductive element includes an electrically connecting part and a compensating elastic part. The metal elastic element has a corresponsive surface disposed corresponding to and electrically connected to the electrically connecting part. The compensating elastic part is connected to the electrically connecting part.

According to another aspect of the present disclosure, a camera module includes an imaging lens system, one of the aforementioned imaging lens driving modules and an image sensor. The imaging lens system is disposed on the lens carrier of the imaging lens driving module. The image sensor is disposed on an image surface of the imaging lens system.

According to another aspect of the present disclosure, an electronic device includes the aforementioned camera module.

BRIEF DESCRIPTION OF THE DRAWINGS

The disclosure can be better understood by reading the following detailed description of the embodiments, with reference made to the accompanying drawings as follows:

FIG. 16 is a top view of the metal elastic elements in FIG. 1;

FIG. 17 is an enlarged view of region EL5 in FIG. 16;

FIG. 18 is an enlarged view of region EL6 in FIG. 16;

FIG. 40 is a top view of the metal elastic elements in FIG. 39;

FIG. 41 is an enlarged view of region EL 17 in FIG. 40;

FIG. 42 is an enlarged view of region EL 18 in FIG. 40;

DETAILED DESCRIPTION

Figure 1:
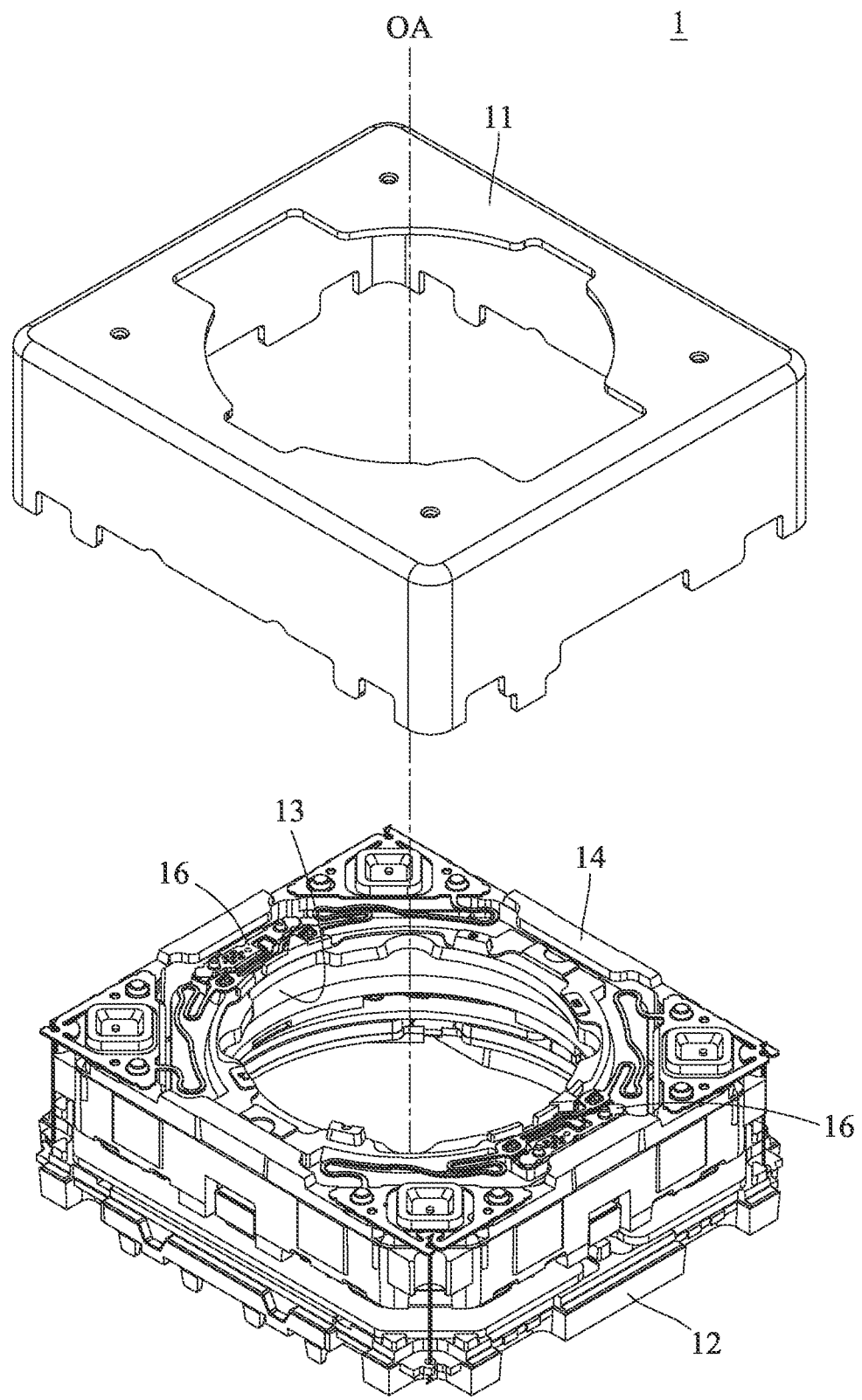
FIG. 1 is a partially exploded view of an imaging lens driving module according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides an imaging lens driving module. The imaging lens driving module includes a lens carrier, a frame element, a driving mechanism and a metal conductive element. The lens carrier is configured for holding an imaging lens system. The frame element forms an interior space for the lens carrier to be disposed therein. The driving mechanism is configured for driving the lens carrier to move in a direction parallel to an optical axis of the imaging lens system. The metal conductive element is coupled to the lens carrier.

The driving mechanism includes a metal elastic element, a coil and a magnet assembly. The metal elastic element includes an outer fixing part, an inner fixing part and an elastic part. The outer fixing part is coupled to the frame element. The inner fixing part is located closer to the lens carrier than the outer fixing part to the lens carrier, and the inner fixing part is coupled to the lens carrier. The elastic part is connected to the outer fixing part and inner fixing part. The coil is fixed to the lens carrier, and the magnet assembly is disposed corresponding to the coil.

The metal elastic element further includes an electrically connecting part and a compensating elastic part. The metal conductive element has a corresponsive surface disposed corresponding to and electrically connected to the electrically connecting part. The compensating elastic part is connected to the electrically connecting part and the inner fixing part. Therefore, the flatness of the metal elastic element can be compensated so as to prevent the metal elastic element from tilting, thereby increasing manufacturing yield rate of the imaging lens driving module. Said electrical connection can be achieved by a welding process or dispensing process, and the present disclosure is not limited thereto. Moreover, the compensating elastic part of the metal elastic element can correct extra assembly errors and reduce the possibility of assembly warpage of the metal elastic element. Furthermore, the compensating elastic part of the metal elastic element can at least ensure that the electrically connecting part and the corresponsive surface of the metal conductive element are at least partially in physical contact with each other. Please refer to FIG. 15, which is an enlarged schematic view of the electrically connecting part 1515 of the metal elastic element 151 and the corresponsive surface 161 of the metal conductive element 16 during an assembly process according to the 1st embodiment of the present disclosure. As seen, the electrically connecting part 1515 and the corresponsive surface 161 are at least partially in physical contact with each other. Moreover, the compensating elastic part is a relatively weak part in structural strength of the metal elastic element.

The electrically connecting part of the metal elastic element can overlap the corresponsive surface of the metal conductive element in the direction parallel to the optical axis. Therefore, the electrically connection position between the metal elastic element and the metal conductive element can be more easily positioned during an automated manufacturing process, thereby improving manufacturing efficiency.

When a sectional area of the elastic part of the metal elastic element is A0, and a minimum sectional area of the compensating elastic part of the metal elastic element is A1, the following condition can be satisfied: $0.05 < A1/A0 < 2.0$. Therefore, it can be ensured that the warpage of the metal elastic element occurs at the compensating elastic part thereof during the assembly process, thereby reducing assembly errors. Moreover, the following condition can also be satisfied: $0.1 < A1/A0 < 1.3$, which corresponds to different structural design of the compensating elastic part, and the condition defines a range for better reducing assembly warpage. Please refer to FIG. 20, FIG. 22, FIG. 24 and FIG. 26, which show schematic views of A0 and A1 according to the 1st embodiment of the present disclosure.

The metal conductive element can be disposed between the lens carrier and the electrically connecting part of the metal elastic element. Therefore, the metal conductive element can absorb collision forces during the assembly process so as to ensure good resolution quality of the imaging lens system. In one configuration, each metal conductive element can have at least two fastening holes, such that the metal conductive element is unable to rotate, thereby improving assembly efficiency.

The electrically connecting part of the metal elastic element can be in physical contact with the corresponsive surface of the metal conductive element. Therefore, if the metal elastic element warps, it is ensured that the electrically connecting part and the corresponsive surface are still at least partially in physical contact with each other, and optionally, an electrical conductive material can be filled in an air gap between the electrically connecting part and the corresponsive surface so as to ensure that the stability of electrical connection therebetween is not compromised by the assembly warpage.

There can be a tapered air gap between the electrically connecting part of the metal elastic element and the corresponsive surface of the metal conductive element. Therefore, the air gap being tapered towards the contact point of the electrically connecting part and the corresponsive surface ensures that the electrically connecting part and the corresponsive surface are at least partially in physical contact with each other, thereby ensuring the electrical connection therebetween.

The present disclosure provides another imaging lens driving module. The imaging lens driving module includes a lens carrier, a frame element, a driving mechanism and a metal conductive element. The lens carrier is configured for holding an imaging lens system. The frame element forms an interior space for the lens carrier to be disposed therein. The driving mechanism is configured for driving the lens carrier to move in a direction parallel to an optical axis of the imaging lens system. The metal conductive element is coupled to the lens carrier.

The driving mechanism includes a metal elastic element, a coil and a magnet assembly. The metal elastic element includes an outer fixing part, an inner fixing part and an elastic part. The outer fixing part is coupled to the frame element. The inner fixing part is located closer to the lens carrier than the outer fixing part to the lens carrier, and the inner fixing part is coupled to the lens carrier. The elastic part is connected to the outer fixing part and inner fixing part. The coil is fixed to the lens carrier, and the magnet assembly is disposed corresponding to the coil.

The metal conductive element includes an electrically connecting part and a compensating elastic part. The metal elastic element has a corresponsive surface disposed corresponding to and electrically connected to the electrically connecting part. The compensating elastic part is connected to the electrically connecting part. Therefore, the flatness of the metal conductive element can be compensated so as to prevent the metal conductive element from tilting, thereby reducing manufacturing cost. Said electrical connection can be achieved by a welding process or dispensing process, and the present disclosure is not limited thereto. Moreover, the metal conductive element can be a wire electrically connected to the coil and the metal elastic element. Furthermore, the corresponsive surface of the metal elastic element can be a compatible step surface having a structure of a recessed surface area. Please refer to FIG. 84 and FIG. 87, which show schematic views of the corresponsive surface 1516ƒ of the metal elastic element 151ƒ according to the 6th embodiment of the present disclosure.

The electrically connecting part of the metal conductive element can overlap the corresponsive surface of the metal elastic element in the direction parallel to the optical axis. Therefore, the electrically connection position between the metal conductive element and the metal elastic element can be more easily positioned during an automated manufacturing process, thereby improving manufacturing efficiency.

When a sectional area of the elastic part of the metal elastic element is A0, and a minimum sectional area of the compensating elastic part of the metal conductive element is A1, the following condition can be satisfied: $0.1 < A1/A0 < 1.3$. Therefore, it can be ensured that the warpage of the metal conductive element occurs at the compensating elastic part thereof during the assembly process, thereby reducing assembly errors. Please refer to FIG. 86, FIG. 88, FIG. 92 and FIG. 94, which show schematic views of A0 and A1 according to the 6th embodiment of the present disclosure.

The metal elastic element can be disposed between the lens carrier and the electrically connecting part of the metal conductive element. Therefore, the metal conductive element can absorb collision forces during the assembly process so as to ensure good resolution quality of the imaging lens system.

According to the present disclosure, the aforementioned features and conditions can be utilized in numerous combinations so as to achieve corresponding effects.

According to the above description of the present disclosure, the following specific embodiments are provided for further explanation.

1st Embodiment

Figure 2:
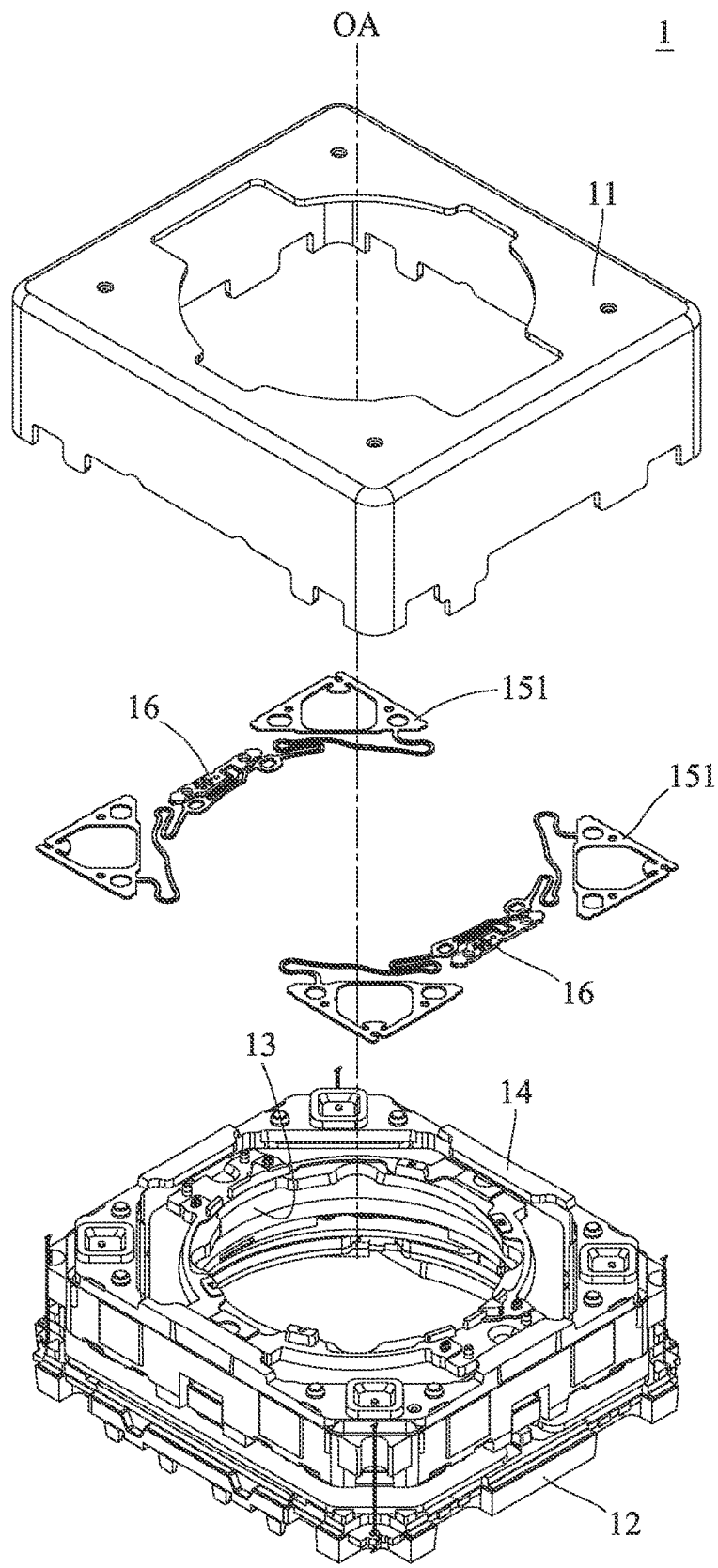
FIG. 2 is another partially exploded view of the imaging lens driving module in FIG. 1.
Figure 3:
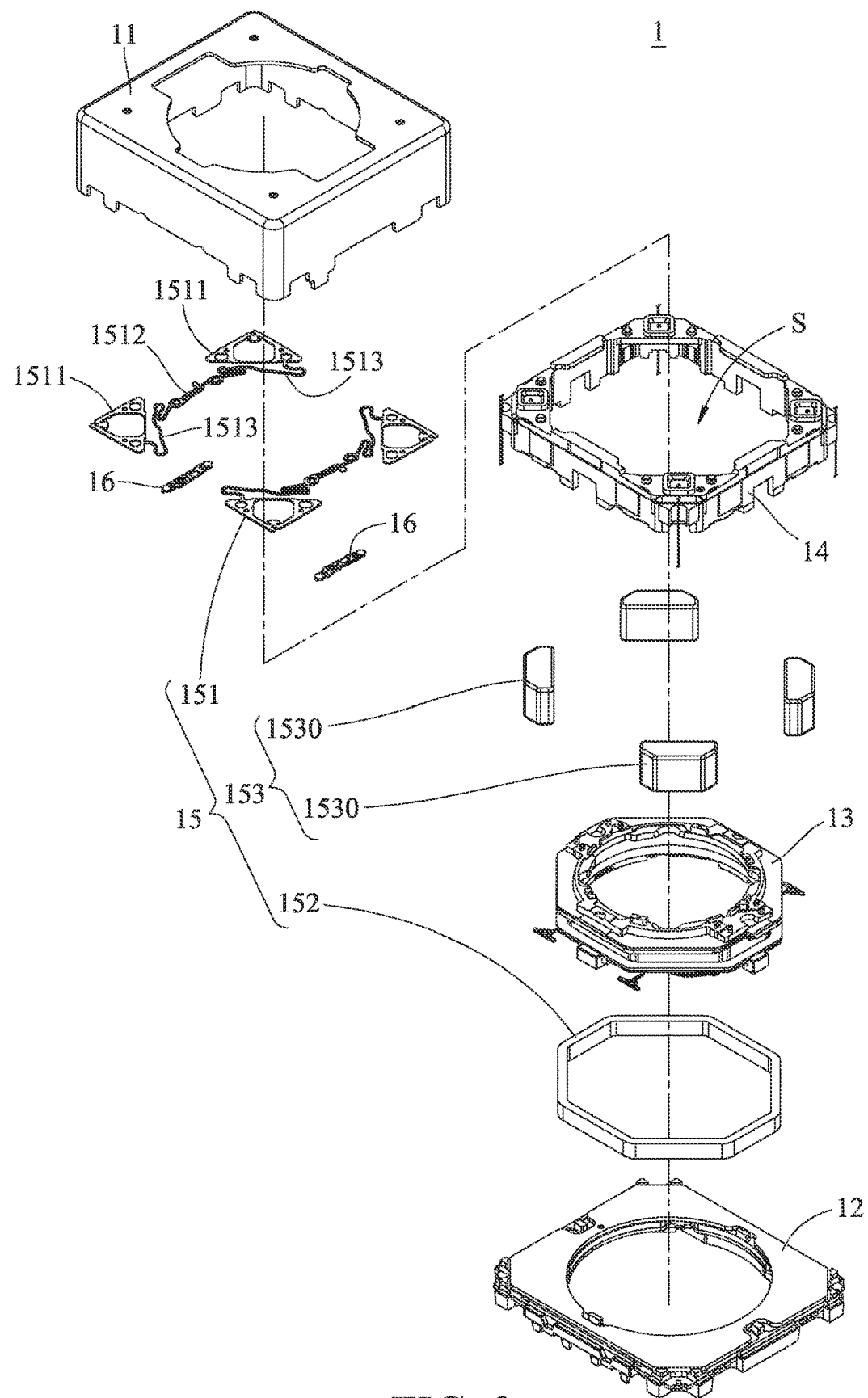
FIG. 3 is an exploded view of the imaging lens driving module in FIG. 1.
Figure 4:
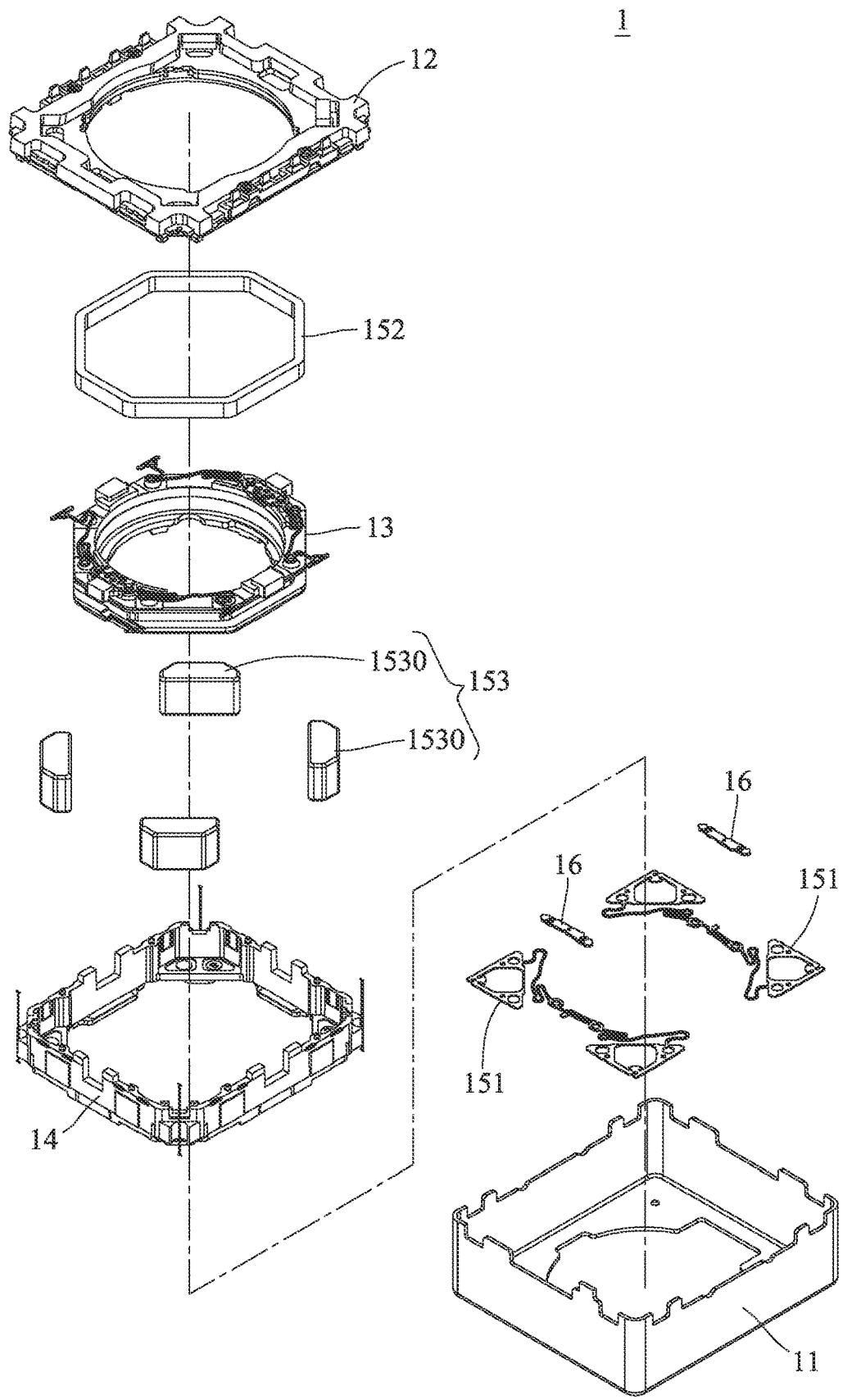
FIG. 4 is another exploded view of the imaging lens driving module in FIG. 1.
Figure 5:
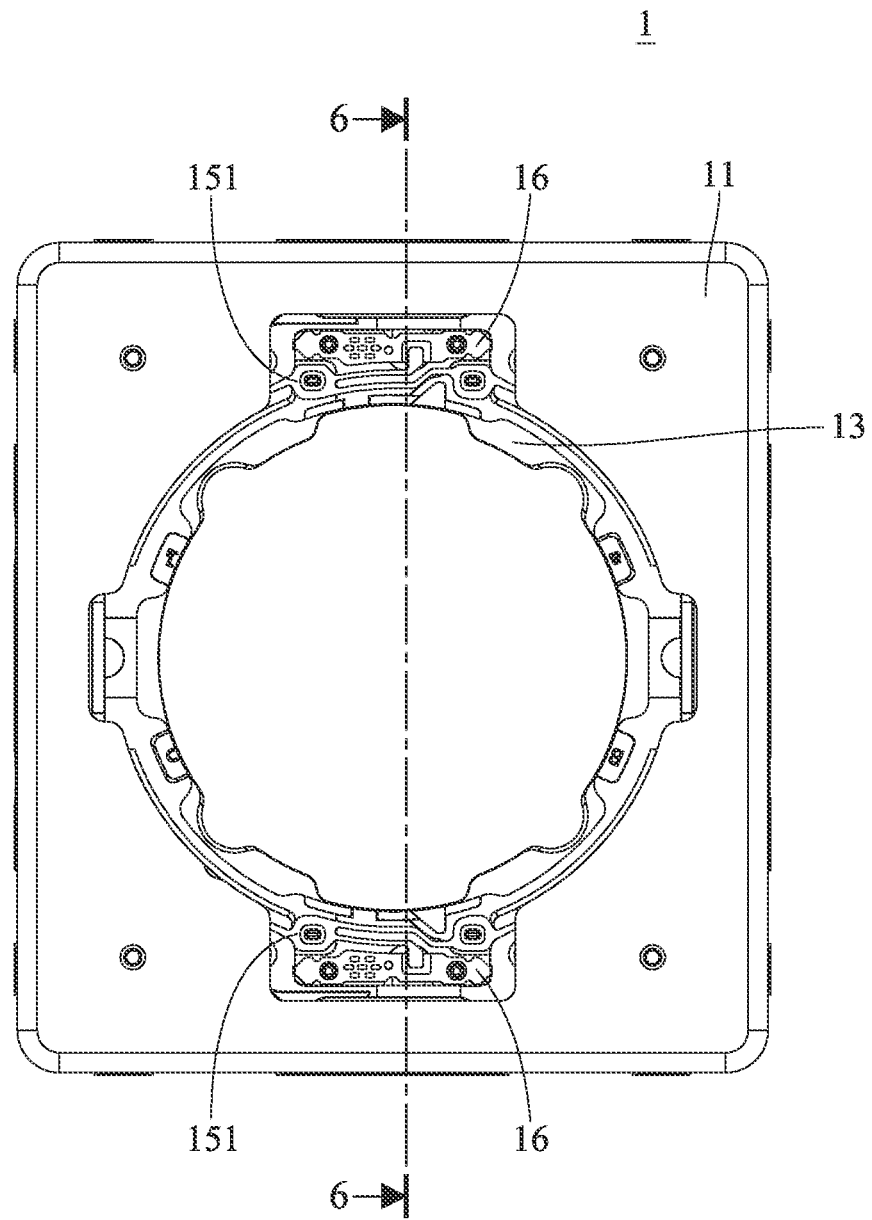
FIG. 5 is a top view of the imaging lens driving module in FIG. 1.
Figure 6:
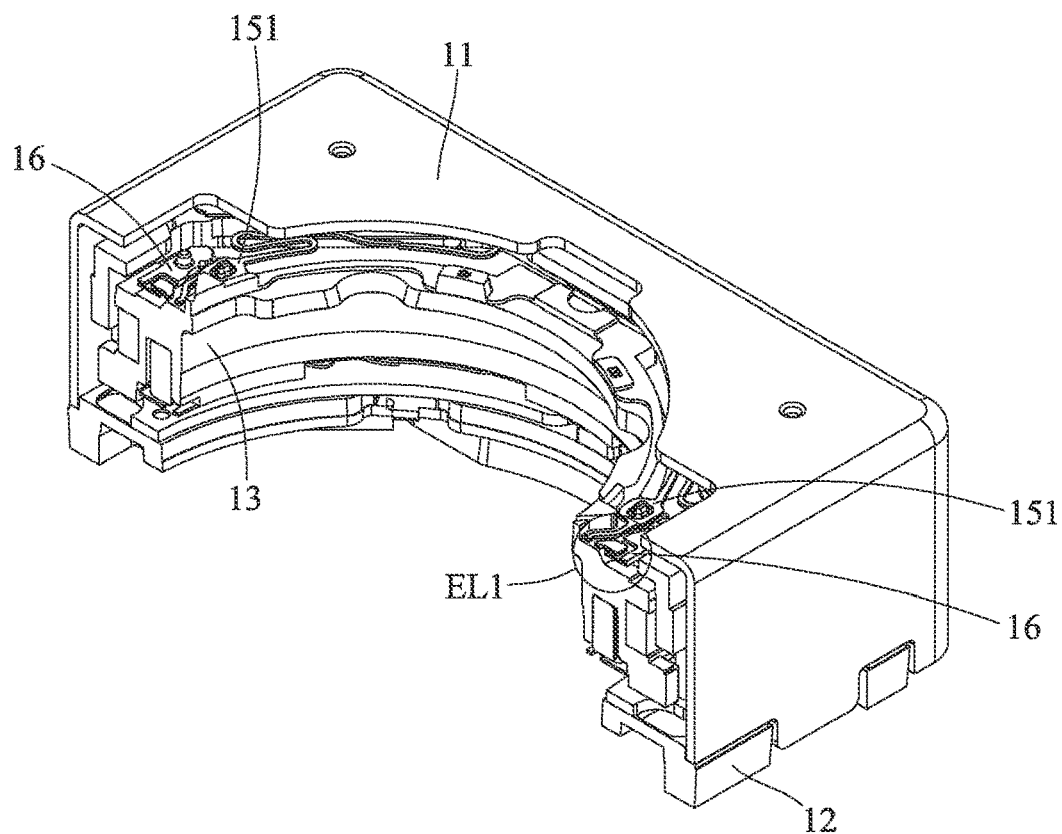
FIG. 6 is a sectional view of the imaging lens driving module along line 6-6 in FIG. 5.
Figure 7:
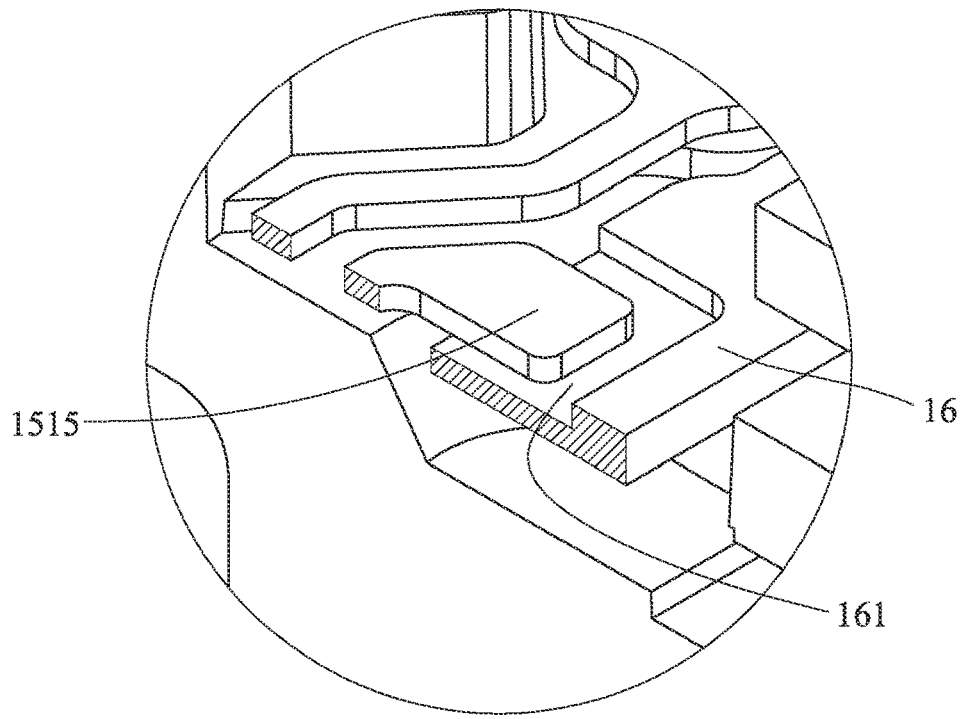
FIG. 7 is an enlarged view of region EL1 in FIG. 6.

Please refer to FIG. 1 to FIG. 7. FIG. 1 is a partially exploded view of an imaging lens driving module according to the 1st embodiment of the present disclosure, FIG. 2 is another partially exploded view of the imaging lens driving module in FIG. 1, FIG. 3 is an exploded view of the imaging lens driving module in FIG. 1, FIG. 4 is another exploded view of the imaging lens driving module in FIG. 1, FIG. 5 is a top view of the imaging lens driving module in FIG. 1, FIG. 6 is a sectional view of the imaging lens driving module along line 6-6 in FIG. 5, and FIG. 7 is an enlarged view of region EL1 in FIG. 6.

In this embodiment, an imaging lens driving module 1 includes a casing 11, a base 12, a lens carrier 13, a frame element 14, a driving mechanism 15 and two metal conductive elements 16.

The casing 11 is disposed on the base 12 and together form a storage space. The lens carrier 13 is configured for holding an imaging lens system (not shown in figure). The frame element 14 is disposed on the base 12 and located in the storage space, and the frame element 14 forms an interior space S for the lens carrier 13 to be disposed therein.

The driving mechanism 15 is configured for driving the lens carrier 13 to move in a direction parallel to an optical axis OA of the imaging lens system, and the driving mechanism 15 includes two metal elastic elements 151, a coil 152 and a magnet assembly 153.

Each of the metal elastic elements 151 includes two outer fixing parts 1511, an inner fixing part 1512 and two elastic parts 1513. The outer fixing parts 1511 are coupled to the frame element 14. The inner fixing part 1512 is located closer to the lens carrier 13 than the outer fixing parts 1511 to the lens carrier 13, and the inner fixing part 1512 is coupled to the lens carrier 13. Each of the elastic parts 1513 is connected to the inner fixing part 1512 and one of the outer fixing parts 1511.

The coil 152 surrounds and is fixed to the lens carrier 13. The magnet assembly 153 includes four magnets 1530 fixed to the frame element 14 and disposed corresponding to the coil 152. In this embodiment, the four magnets 1530 of the magnet assembly 153 together surround the lens carrier 13 and the coil 152.

Figure 8:
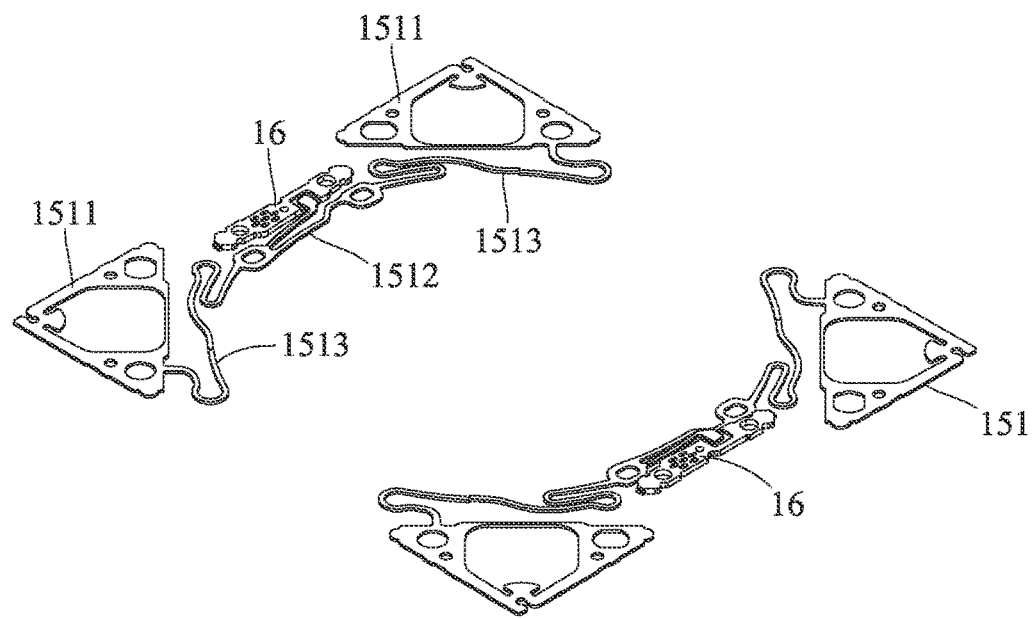
FIG. 8 is a perspective view of metal elastic elements and metal conductive elements in FIG. 1 during an assembly process.
Figure 9:
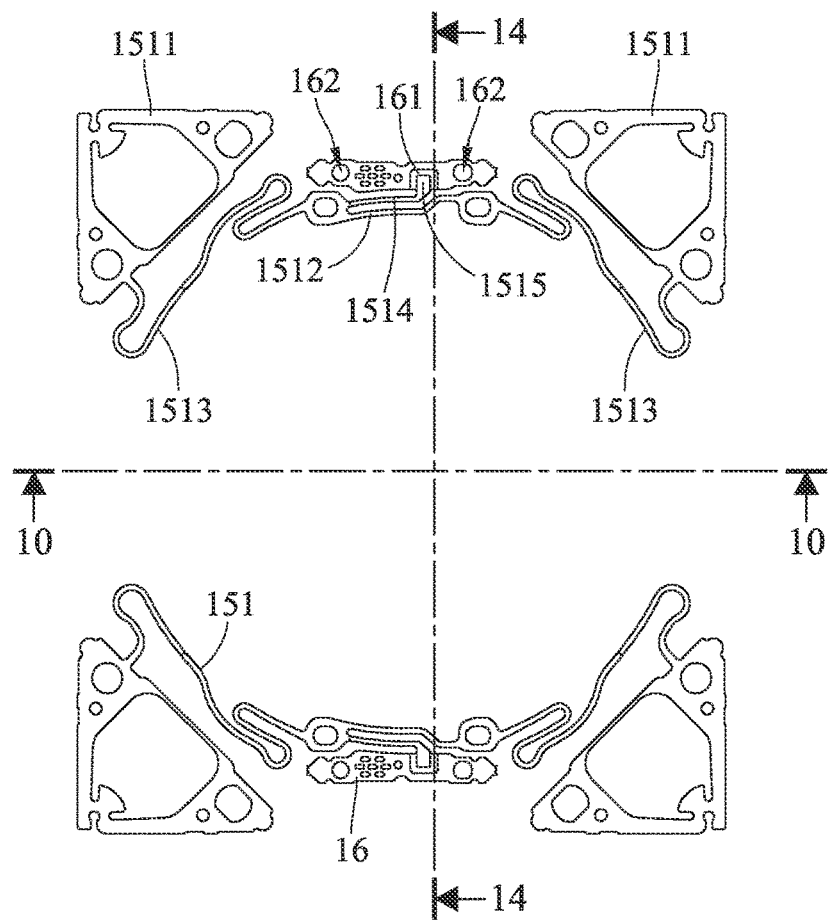
FIG. 9 is a top view of the metal elastic elements and the metal conductive elements in FIG. 8.
Figure 10:
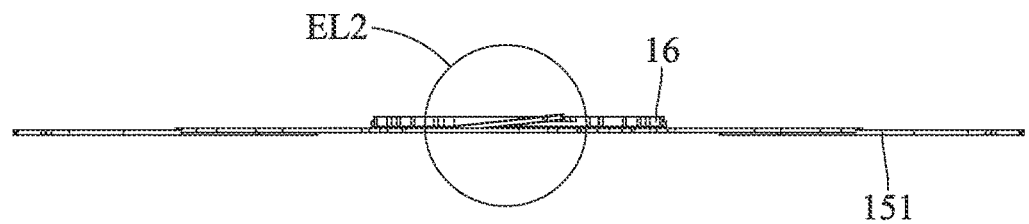
FIG. 10 is a cross-sectional view of the metal elastic elements and the metal conductive elements along line 10-10 in FIG. 9.
Figure 11:
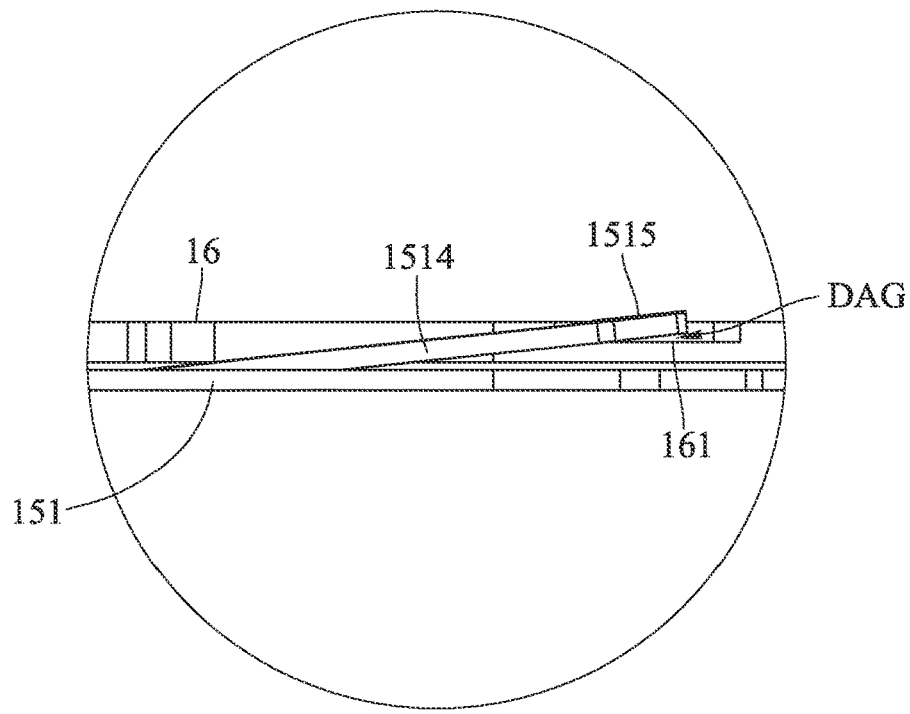
FIG. 11 is an enlarged view of region EL2 in FIG. 10.
Figure 12:
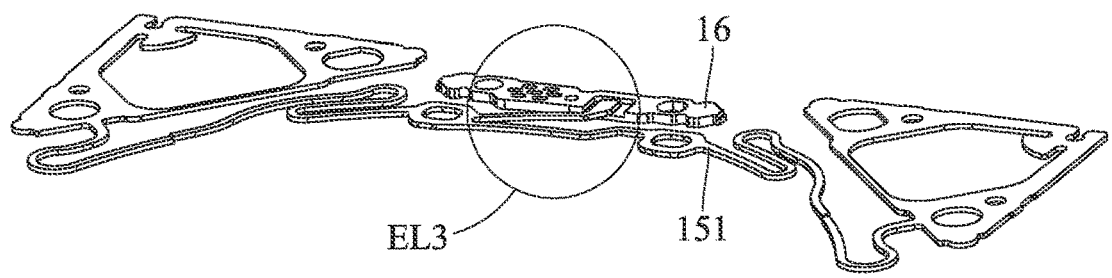
FIG. 12 is a perspective view of one of the metal elastic elements and one of the metal conductive elements in FIG. 8.
Figure 13:
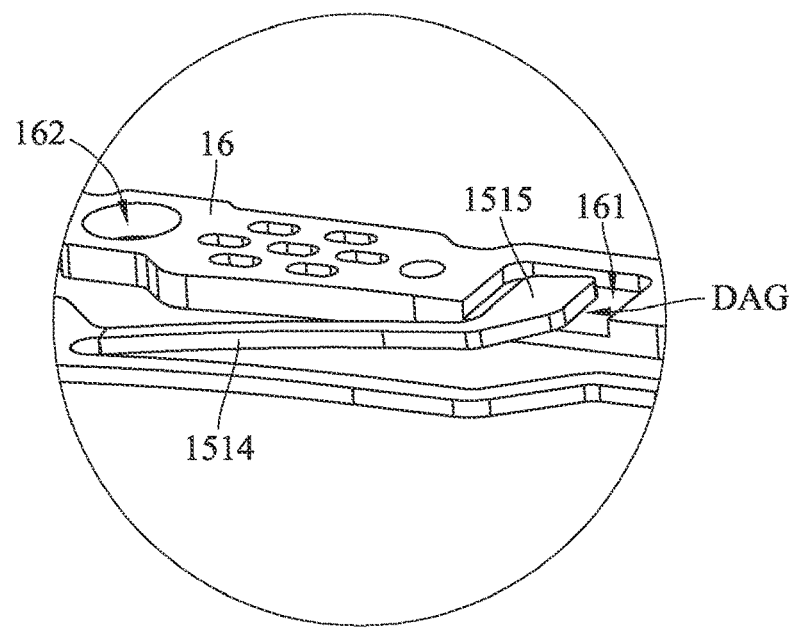
FIG. 13 is an enlarged view of region EL3 in FIG. 12.
Figure 14:
FIG. 14 is a cross-sectional view of the metal elastic elements and the metal conductive elements along line 14-14 in FIG. 9.
Figure 15:
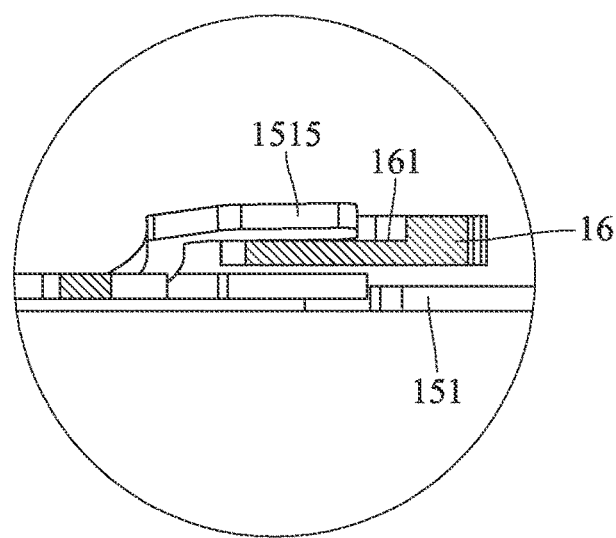
FIG. 15 is an enlarged view of region EL4 in FIG. 14.

Please refer to FIG. 8 to FIG. 15. FIG. 8 is a perspective view of metal elastic elements and metal conductive elements in FIG. 1 during an assembly process, FIG. 9 is a top view of the metal elastic elements and the metal conductive elements in FIG. 8, FIG. 10 is a cross-sectional view of the metal elastic elements and the metal conductive elements along line 10-10 in FIG. 9, FIG. 11 is an enlarged view of region EL2 in FIG. 10, FIG. 12 is a perspective view of one of the metal elastic elements and one of the metal conductive elements in FIG. 8, FIG. 13 is an enlarged view of region EL3 in FIG. 12, FIG. 14 is a cross-sectional view of the metal elastic elements and the metal conductive elements along line 14-14 in FIG. 9, and FIG. 15 is an enlarged view of region EL4 in FIG. 14.

Each of the metal conductive elements 16 has a corresponsive surface 161 and two fastening holes 162. The metal conductive elements 16 are fixed to the lens carrier 13 by the engagement between the fastening holes 162 thereof and fastening protrusions (not numbered) of the lens carrier 13.

Each of the metal elastic elements 151 further includes an electrically connecting part 1515 and a compensating elastic part 1514 connected to the electrically connecting part 1515 and the inner fixing part 1512. The metal conductive elements 16 are disposed between the lens carrier 13 and respective electrically connecting parts 1515 of the metal elastic elements 151. The corresponsive surfaces 161 of the metal conductive elements 16 are disposed corresponding to and electrically connected to respective electrically connecting parts 1515 of the metal elastic elements 151. In addition, the electrically connecting parts 1515 overlap and are in physical contact with respective corresponsive surfaces 161 in the direction parallel to the optical axis OA.

As shown in FIG. 8 to FIG. 15, the metal elastic element 151 warps during an assembly process, and the warpage mainly occurs at the compensating elastic part 1514. In addition, as shown in FIG. 15, the metal elastic element 151 warps during the assembly process, and the electrically connecting part 1515 and the corresponsive surface 161 are still partially in physical contact with each other.

There is a tapered air gap DAG between the electrically connecting part 1515 of the metal elastic element 151 and the corresponsive surface 161 of the metal conductive element 16.

Figure 19:
FIG. 19 is a cross-sectional view of the metal elastic elements along line 19-19 in FIG. 16.
Figure 20:
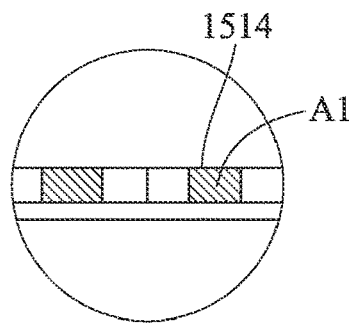
FIG. 20 is an enlarged view of region EL7 in FIG. 19.
Figure 21:
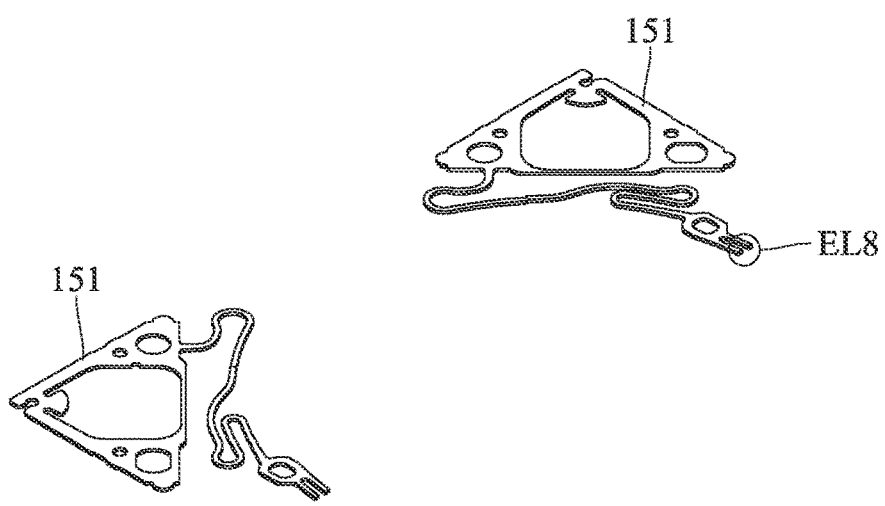
FIG. 21 a sectional view of the metal elastic elements along line 19-19 in FIG. 16.
Figure 22:
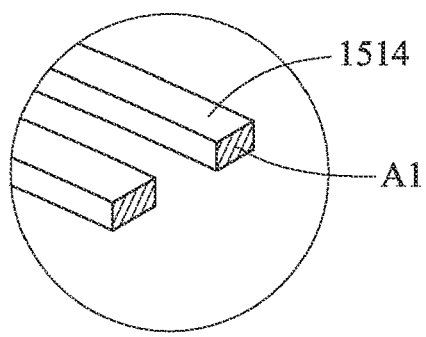
FIG. 22 is an enlarged view of region EL8 in FIG. 21.
Figure 23:
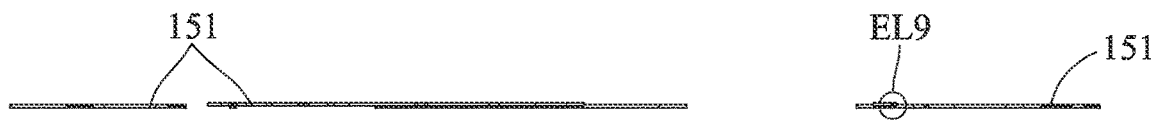
FIG. 23 is a cross-sectional view of the metal elastic elements along line 23-23 in FIG. 16.
Figure 24:
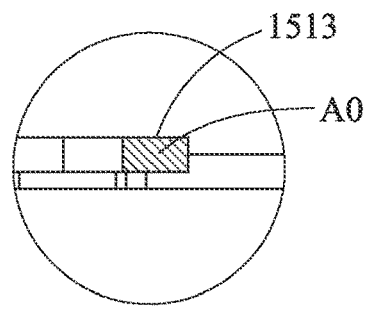
FIG. 24 is an enlarged view of region EL9 in FIG. 23.
Figure 25:
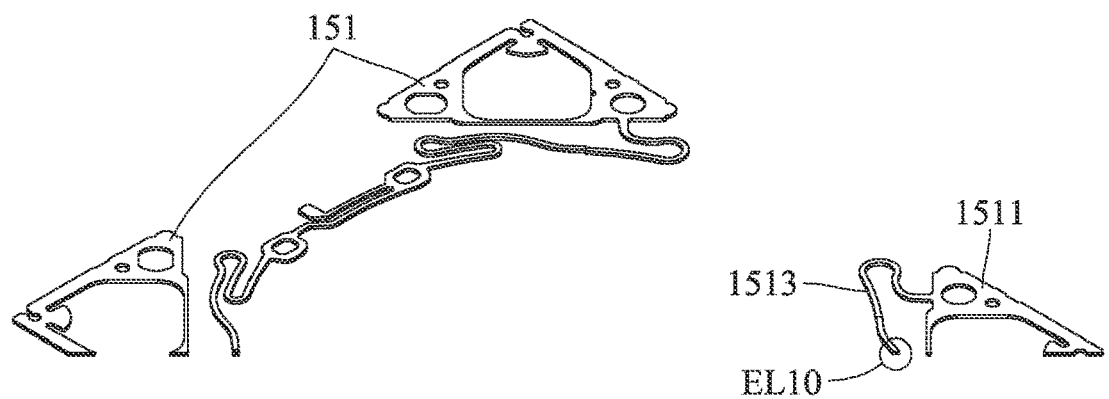
FIG. 25 is a sectional view of the metal elastic elements along line 23-23 in FIG. 16.
Figure 26:
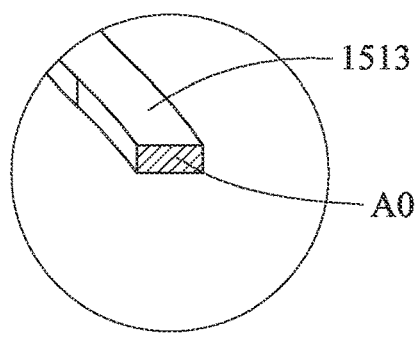
FIG. 26 is an enlarged view of region EL10 in FIG. 25.

Please refer to FIG. 16 to FIG. 26. FIG. 16 is a top view of the metal elastic elements in FIG. 1, FIG. 17 is an enlarged view of region EL5 in FIG. 16, FIG. 18 is an enlarged view of region EL6 in FIG. 16, FIG. 19 is a cross-sectional view of the metal elastic elements along line 19-19 in FIG. 16, FIG. 20 is an enlarged view of region EL7 in FIG. 19, FIG. 21 a sectional view of the metal elastic elements along line 19-19 in FIG. 16, FIG. 22 is an enlarged view of region EL8 in FIG. 21, FIG. 23 is a cross-sectional view of the metal elastic elements along line 23-23 in FIG. 16, FIG. 24 is an enlarged view of region EL9 in FIG. 23, FIG. 25 is a sectional view of the metal elastic elements along line 23-23 in FIG. 16, and FIG. 26 is an enlarged view of region EL10 in FIG. 25. The position of a sectional area A1 of the compensating elastic part 1514 as shown in FIG. 20 and FIG. 22 is located at the section CR2 as shown in FIG. 18, and the position of a sectional area A0 of the elastic part 1513 as shown in FIG. 24 and FIG. 26 is located at the section CR1 as shown in FIG. 17.

When the sectional area of the elastic part 1513 of the metal elastic element 151 is A0, and a minimum sectional area of the compensating elastic part 1514 of the metal elastic element 151 is A1, the following conditions are satisfied: A0=0.0030 mm$^2$; A1=0.0024 mm$^2$; and A1/A0=0.80. In this embodiment, the compensating elastic part 1514 of the metal elastic element 151 has a constant sectional area.

2nd Embodiment

Figure 27:
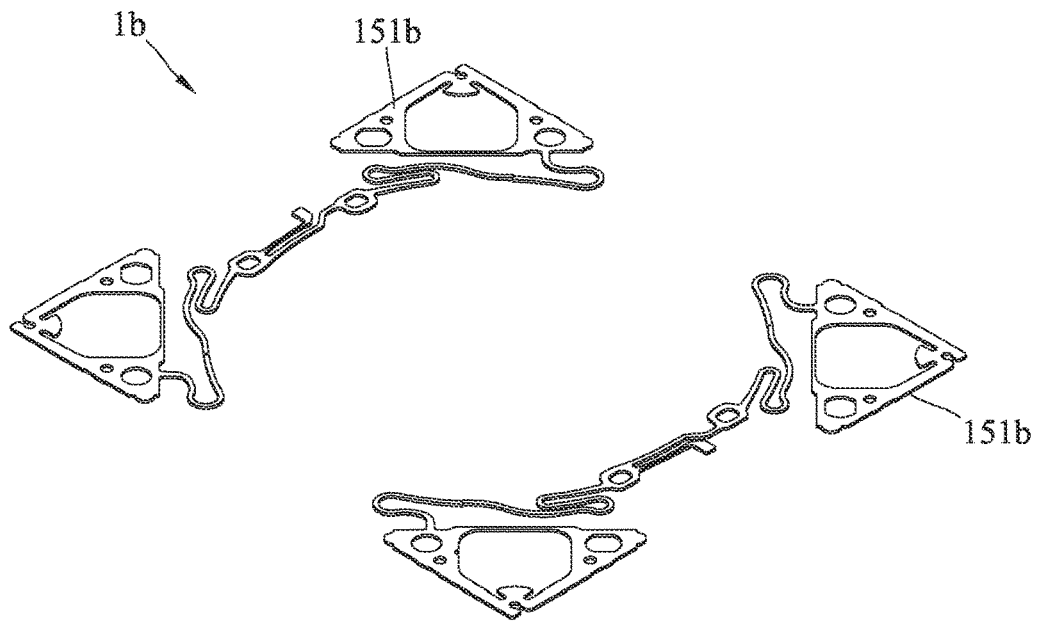
FIG. 27 is a perspective view of metal elastic elements of an imaging lens driving module according to the 2nd embodiment of the present disclosure.
Figure 28:
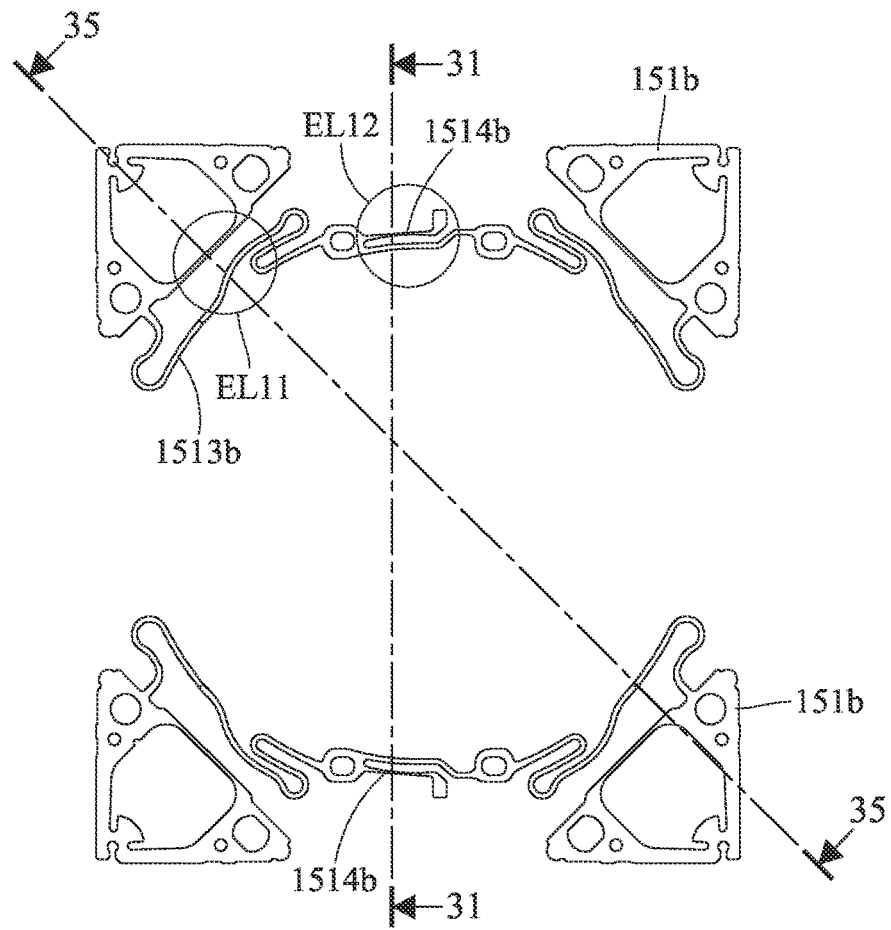
FIG. 28 is a top view of the metal elastic elements in FIG. 27.
Figure 29:
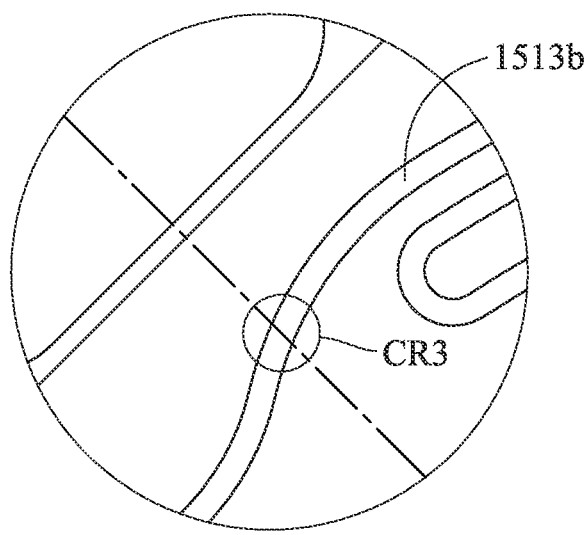
FIG. 29 is an enlarged view of region EL11 in FIG. 28.
Figure 30:
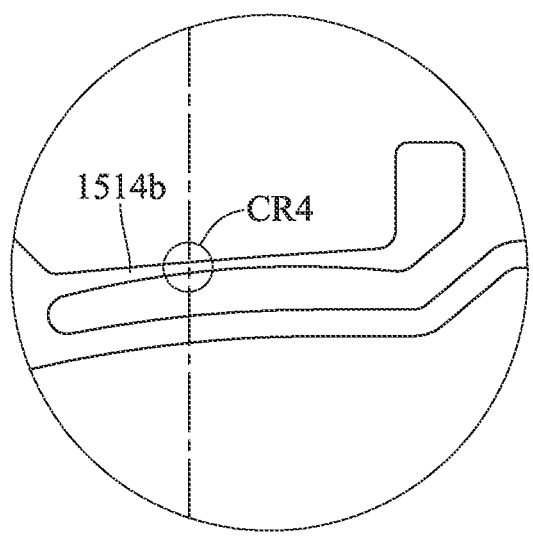
FIG. 30 is an enlarged view of region EL12 in FIG. 28.
Figure 31:
FIG. 31 is a cross-sectional view of the metal elastic elements along line 31-31 in FIG. 28.
Figure 32:
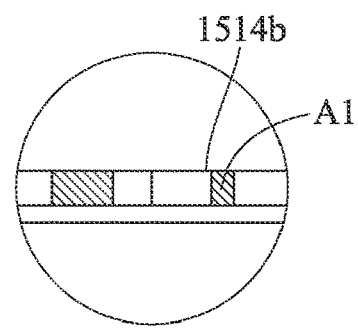
FIG. 32 is an enlarged view of region EL13 in FIG. 31.
Figure 33:
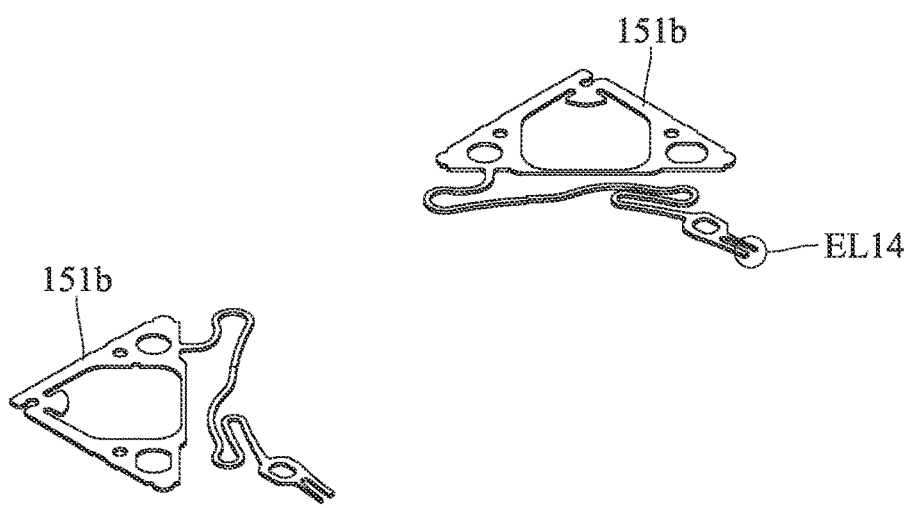
FIG. 33 is a sectional view of the metal elastic elements along line 31-31 in FIG. 28.
Figure 34:
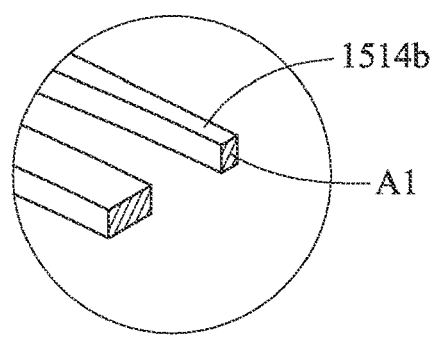
FIG. 34 is an enlarged view of region EL14 in FIG. 33.
Figure 35:
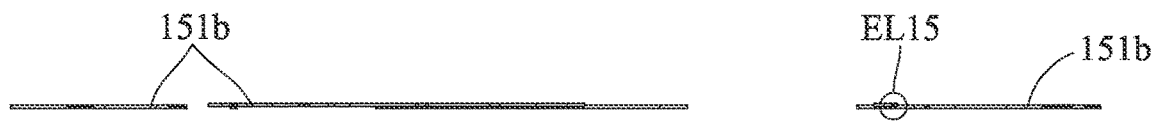
FIG. 35 is a cross-sectional view of the metal elastic elements along line 35-35 in FIG. 28.
Figure 36:
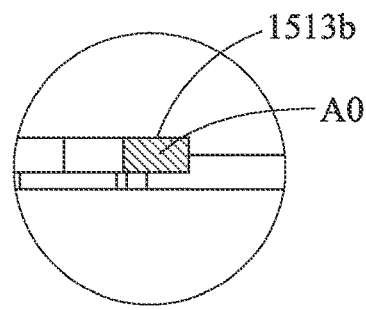
FIG. 36 is an enlarged view of region EL15 in FIG. 35.
Figure 37:
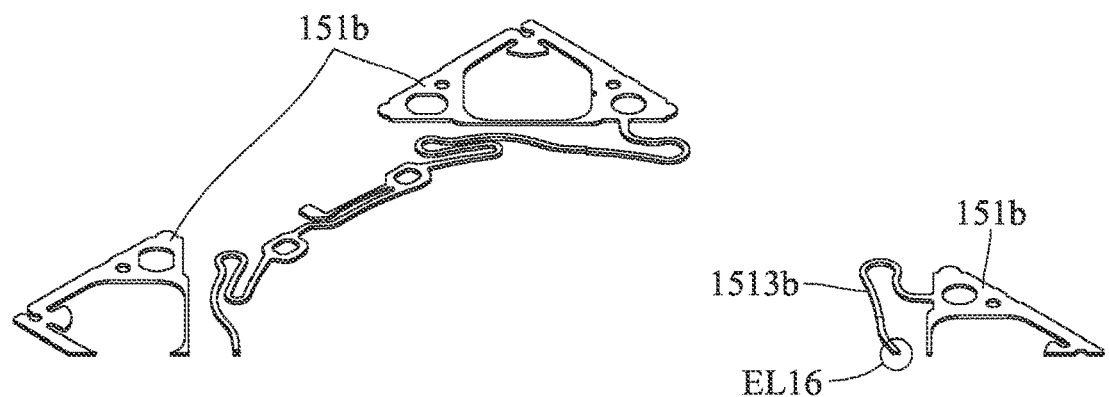
FIG. 37 is a sectional view of the metal elastic elements along line 35-35 in FIG. 28.
Figure 38:
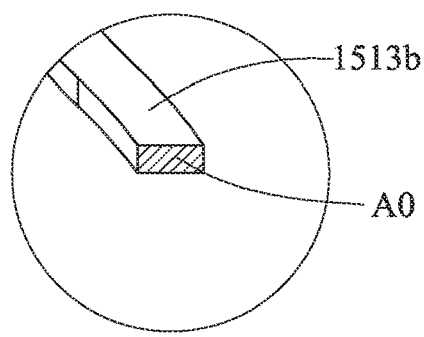
FIG. 38 is an enlarged view of region EL16 in FIG. 37.

Please refer to FIG. 27 to FIG. 38. FIG. 27 is a perspective view of metal elastic elements of an imaging lens driving module according to the 2nd embodiment of the present disclosure, FIG. 28 is a top view of the metal elastic elements in FIG. 27, FIG. 29 is an enlarged view of region EL11 in FIG. 28, FIG. 30 is an enlarged view of region EL12 in FIG. 28, FIG. 31 is a cross-sectional view of the metal elastic elements along line 31-31 in FIG. 28, FIG. 32 is an enlarged view of region EL13 in FIG. 31, FIG. 33 is a sectional view of the metal elastic elements along line 31-31 in FIG. 28, FIG. 34 is an enlarged view of region EL14 in FIG. 33, FIG. 35 is a cross-sectional view of the metal elastic elements along line 35-35 in FIG. 28, FIG. 36 is an enlarged view of region EL15 in FIG. 35, FIG. 37 is a sectional view of the metal elastic elements along line 35-35 in FIG. 28, and FIG. 38 is an enlarged view of region EL16 in FIG. 37.

In this embodiment, an imaging lens driving module 1*b* is provided. The imaging lens driving module 1*b* has a configuration similar to that of the imaging lens driving module 1 as disclosed in the 1st embodiment, and they are different from each other in that the structural feature of metal elastic elements 151*b* in this embodiment is different from that of the metal elastic elements 151 in the 1st embodiment. Said imaging lens driving modules of the two embodiments having similar configurations with each other refers to that except for the metal elastic elements, elements of one of the imaging lens driving modules have structural features, for example, the same as that of the other of the imaging lens driving modules.

In specific, in this embodiment, a minimum sectional area of a compensating elastic part 1514*b* of the metal elastic element 151*b* is different from the minimum sectional area of the compensating elastic part 1514 of the metal elastic element 151 which is disclosed in the 1st embodiment. In addition, the compensating elastic part 1514*b* of the metal elastic element 151*b* tapers from its two opposite ends towards its middle portion; that is, the compensating elastic part 1514*b* has larger sectional areas at its two opposite ends than that at its middle portion.

In this embodiment, when a sectional area of an elastic part 1513*b* of the metal elastic element 151*b* is A0, and the minimum sectional area of the compensating elastic part 1514*b* of the elastic element 151*b* is A1, the following conditions are satisfied: A0=0.0030 mm$^2$; A1=0.0011 mm$^2$; and A1/A0=0.37. In addition, the compensating elastic part 1514*b* of the metal elastic element 151*b* has a minimum sectional area at its middle portion. Moreover, the position of the sectional area A1 of the compensating elastic part 1514*b* as shown in FIG. 32 and FIG. 34 is located at the section CR4 as shown in FIG. 30, and the position of the sectional area A0 of the elastic part 1513*b* as shown in FIG. 36 and FIG. 38 is located at the section CR3 as shown in FIG. 29.

3rd Embodiment

Figure 39:
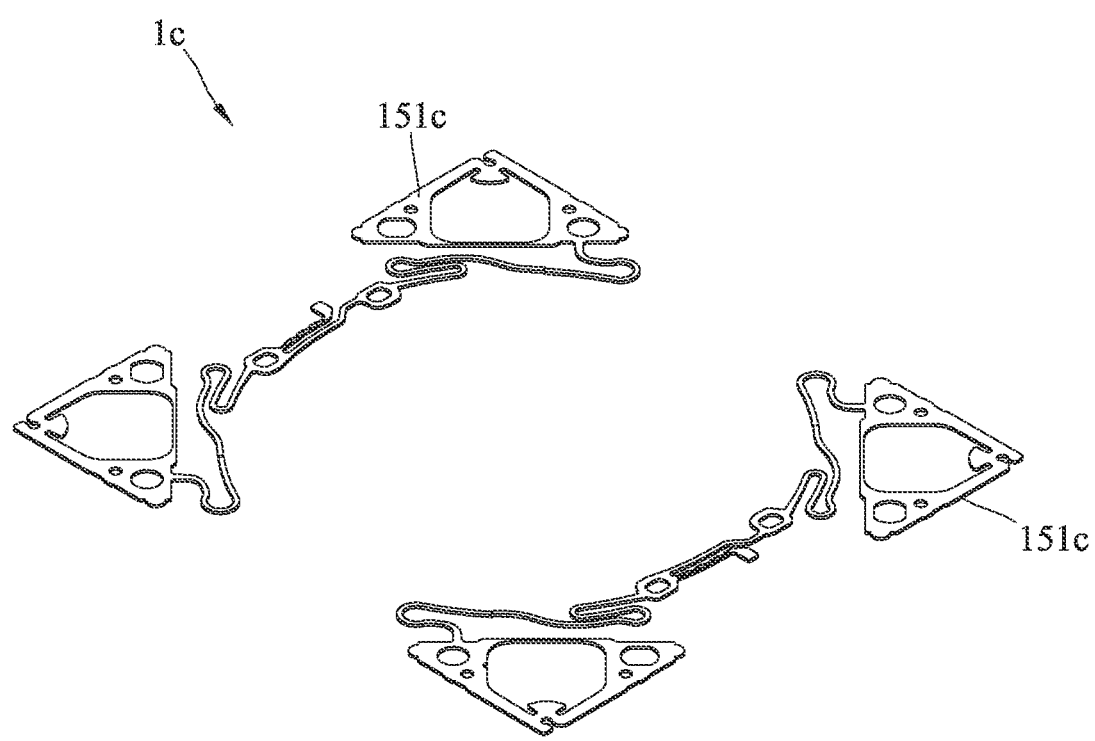
FIG. 39 is a perspective view of metal elastic elements of an imaging lens driving module according to the 3rd embodiment of the present disclosure.
Figure 43:
FIG. 43 is a cross-sectional view of the metal elastic elements along line 43-43 in FIG. 40.
Figure 44:
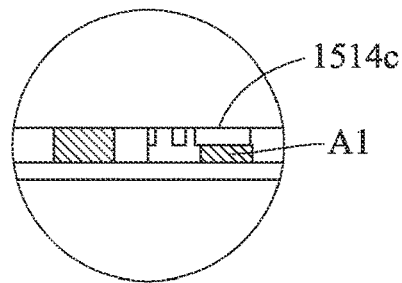
FIG. 44 is an enlarged view of region EL 19 in FIG. 43.
Figure 45:
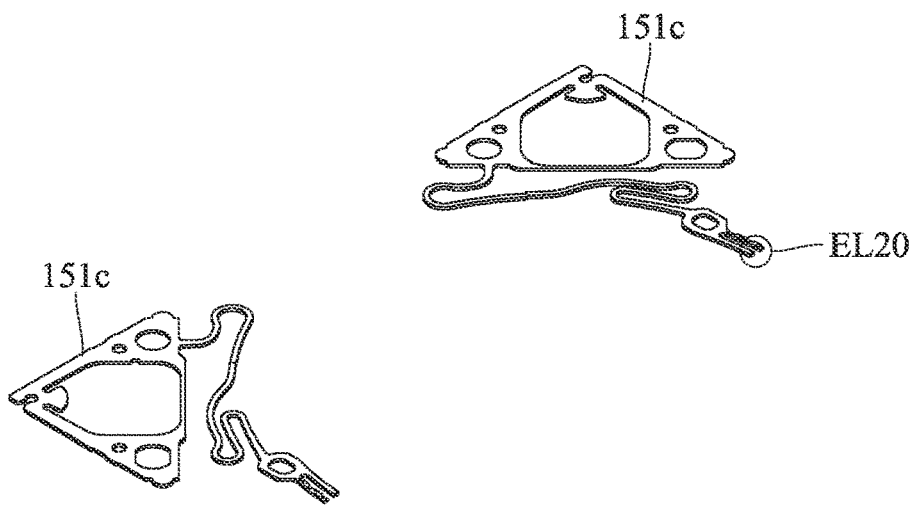
FIG. 45 a sectional view of the metal elastic elements along line 43-43 in FIG. 40.
Figure 46:
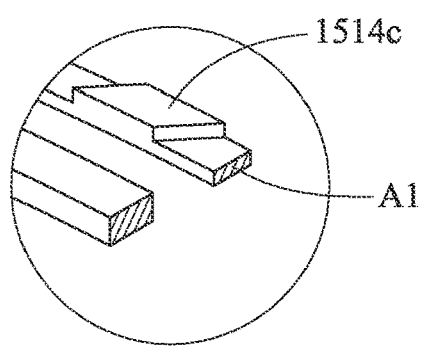
FIG. 46 is an enlarged view of region EL 20 in FIG. 45.
Figure 47:
FIG. 47 is a cross-sectional view of the metal elastic elements along line 47-47 in FIG. 40.
Figure 48:
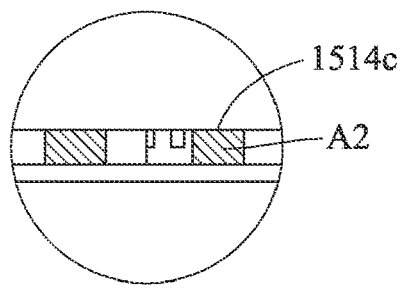
FIG. 48 is an enlarged view of region EL 21 in FIG. 47.
Figure 49:
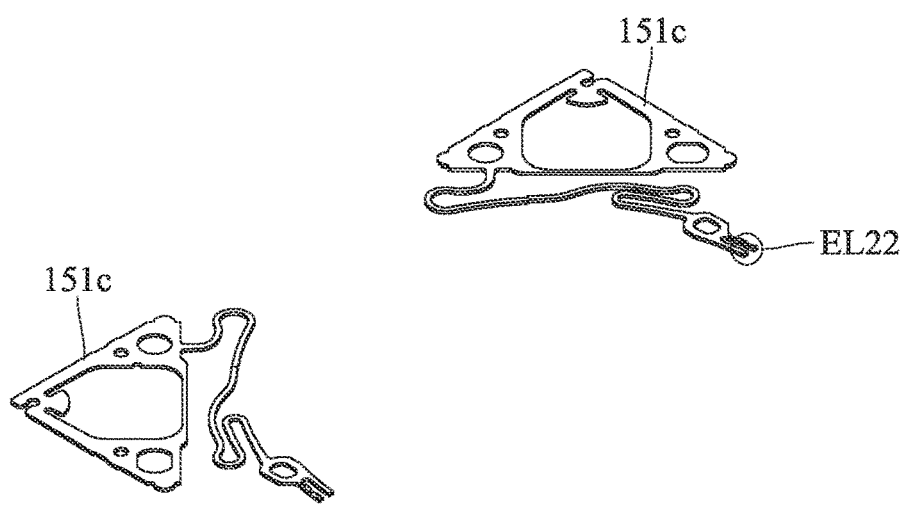
FIG. 49 a sectional view of the metal elastic elements along line 47-47 in FIG. 40.
Figure 50:
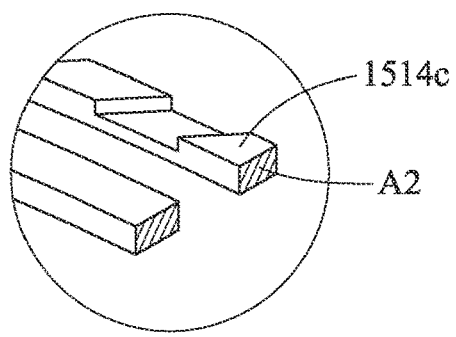
FIG. 50 is an enlarged view of region EL 22 in FIG. 49.
Figure 51:
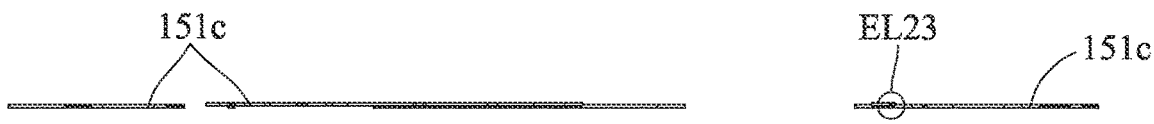
FIG. 51 is a cross-sectional view of the metal elastic elements along line 51-51 in FIG. 40.
Figure 52:
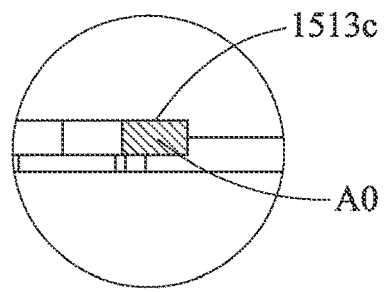
FIG. 52 is an enlarged view of region EL 23 in FIG. 51.
Figure 53:
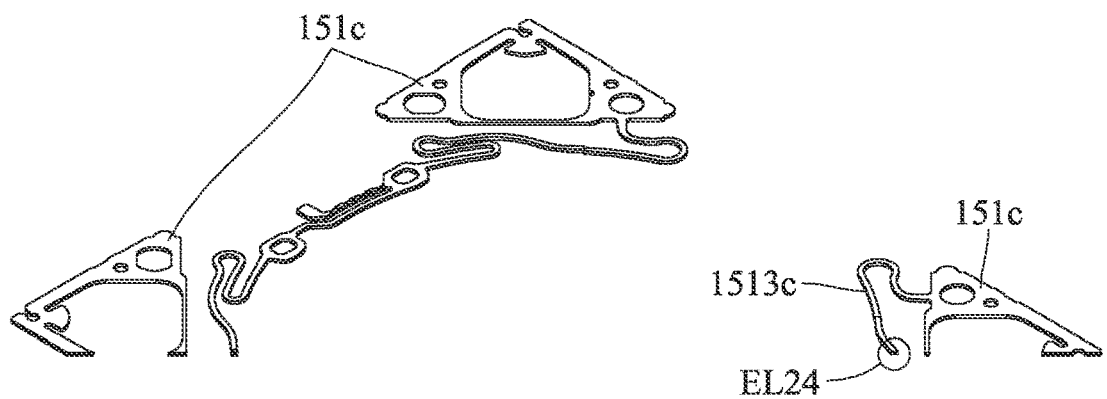
FIG. 53 a sectional view of the metal elastic elements along line 51-51 in FIG. 40.
Figure 54:
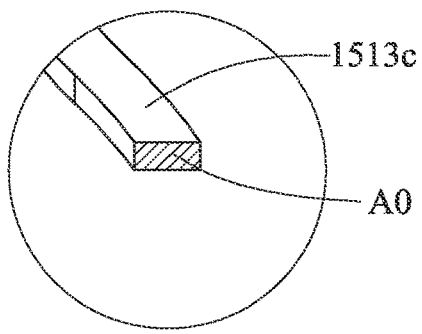
FIG. 54 is an enlarged view of region EL 24 in FIG. 53.

Please refer to FIG. 39 to FIG. 54. FIG. 39 is a perspective view of metal elastic elements of an imaging lens driving module according to the 3rd embodiment of the present disclosure, FIG. 40 is a top view of the metal elastic elements in FIG. 39, FIG. 41 is an enlarged view of region EL 17 in FIG. 40, FIG. 42 is an enlarged view of region EL 18 in FIG. 40, FIG. 43 is a cross-sectional view of the metal elastic elements along line 43-43 in FIG. 40, FIG. 44 is an enlarged view of region EL 19 in FIG. 43, FIG. 45 a sectional view of the metal elastic elements along line 43-43 in FIG. 40, FIG. 46 is an enlarged view of region EL 20 in FIG. 45, FIG. 47 is a cross-sectional view of the metal elastic elements along line 47-47 in FIG. 40, FIG. 48 is an enlarged view of region EL 21 in FIG. 47, FIG. 49 a sectional view of the metal elastic elements along line 47-47 in FIG. 40, FIG. 50 is an enlarged view of region EL 22 in FIG. 49, FIG. 51 is a cross-sectional view of the metal elastic elements along line 51-51 in FIG. 40, FIG. 52 is an enlarged view of region EL 23 in FIG. 51, FIG. 53 a sectional view of the metal elastic elements along line 51-51 in FIG. 40, and FIG. 54 is an enlarged view of region EL 24 in FIG. 53.

In this embodiment, an imaging lens driving module 1c is provided. The imaging lens driving module 1c has a configuration similar to that of the imaging lens driving module 1 as disclosed in the 1st embodiment, and they are different from each other in that the structural feature of metal elastic elements 151c in this embodiment is different from that of the metal elastic elements 151 in the 1st embodiment. Said imaging lens driving modules of the two embodiments having similar configurations with each other refers to that except for the metal elastic elements, elements of one of the imaging lens driving modules have structural features, for example, the same as that of the other of the imaging lens driving modules.

In specific, in this embodiment, a minimum sectional area of a compensating elastic part 1514c of the metal elastic element 151c is different from the minimum sectional area of the compensating elastic part 1514 of the metal elastic element 151 which is disclosed in the 1st embodiment. In addition, the compensating elastic part 1514c of the metal elastic element 151c has alternate thick and thin sections, and its side surface is in a shape of a sawtooth, such that the compensating elastic part 1514c has alternate large and small sectional areas, where the relatively small sectional area is A1 and the relatively large sectional area is A2.

In this embodiment, when a sectional area of an elastic part 1513c of the metal elastic element 151c is A0, and a minimum sectional area of the compensating elastic part 1514c of the metal elastic element 151c is A1, the following conditions are satisfied: A0=0.0030 mm$^2$; A1=0.0012 mm$^2$; and A1/A0=0.40. In addition, the position of the sectional area A1 of the compensating elastic part 1514c as shown in FIG. 44 and FIG. 46 is located at the section CR6 as shown in FIG. 42, and the position of the sectional area A0 of the elastic part 1513c as shown in FIG. 52 and FIG. 54 is located at the section CR5 as shown in FIG. 41.

When the sectional area of the elastic part 1513c of the metal elastic element 151c is A0, and a maximum sectional area of the compensating elastic part 1514c of the metal elastic element 151c is A2, the following condition is satisfied: A0=0.0030 mm$^2$; A2=0.0024 mm$^2$; and A2/A0=0.80. In addition, the position of the sectional area A2 of the compensating elastic part 1514c as shown in FIG. 48 and FIG. 50 is located at the section CR6 as shown in FIG. 42.

4th Embodiment

Figure 55:
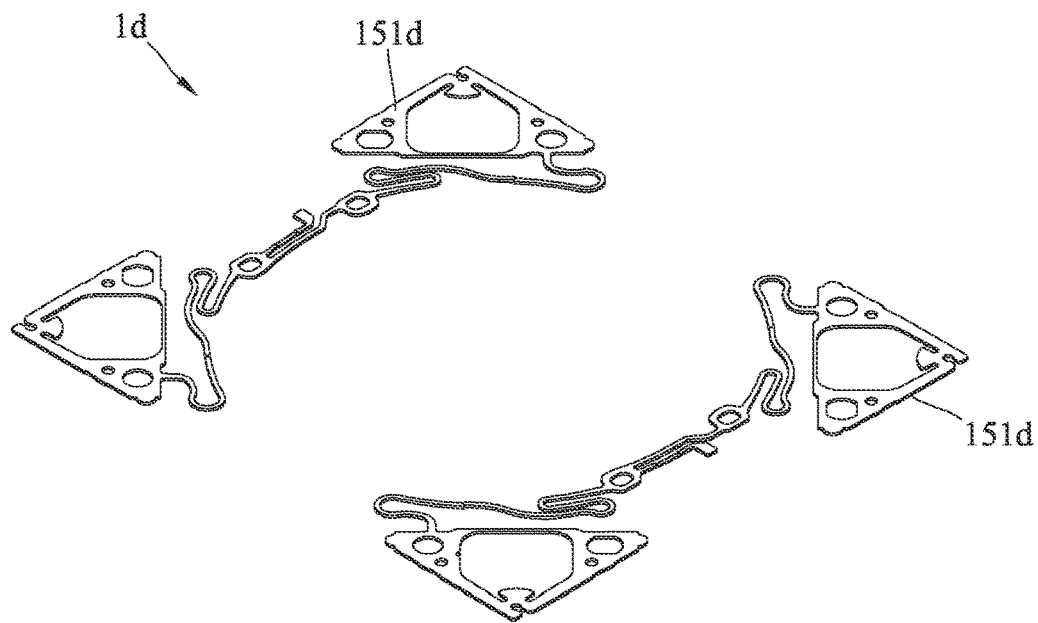
FIG. 55 is a perspective view of metal elastic elements of an imaging lens driving module according to the 4th embodiment of the present disclosure.
Figure 56:
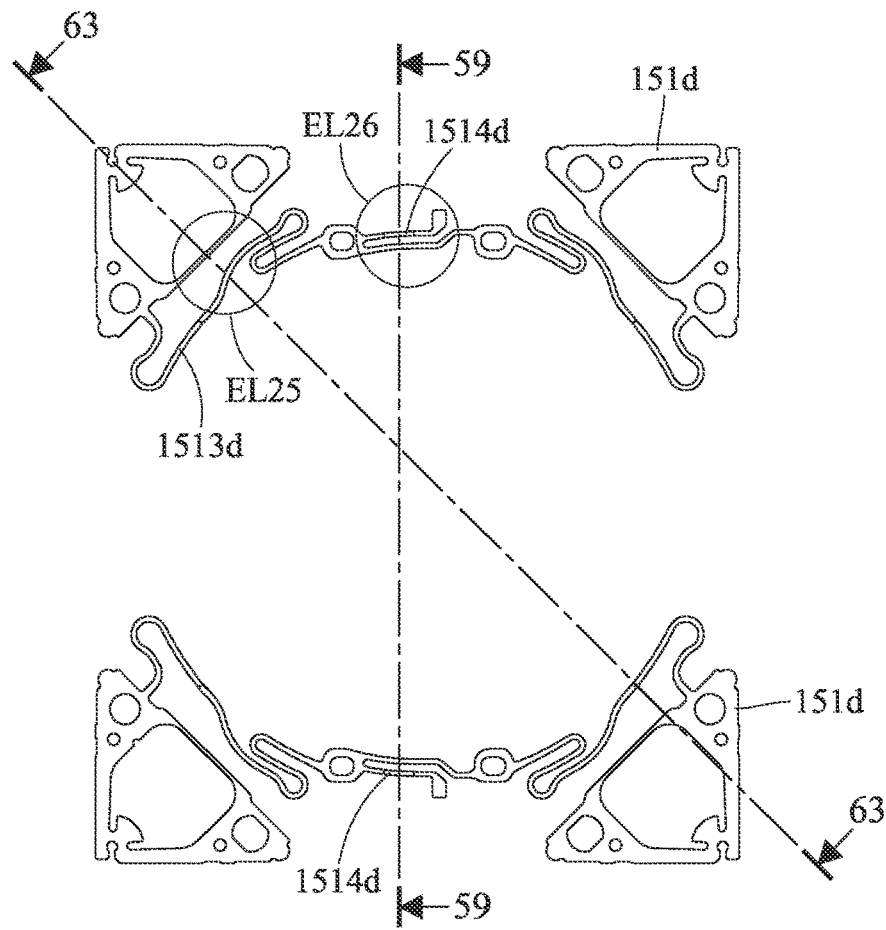
FIG. 56 is a top view of the metal elastic elements in FIG. 55.
Figure 57:
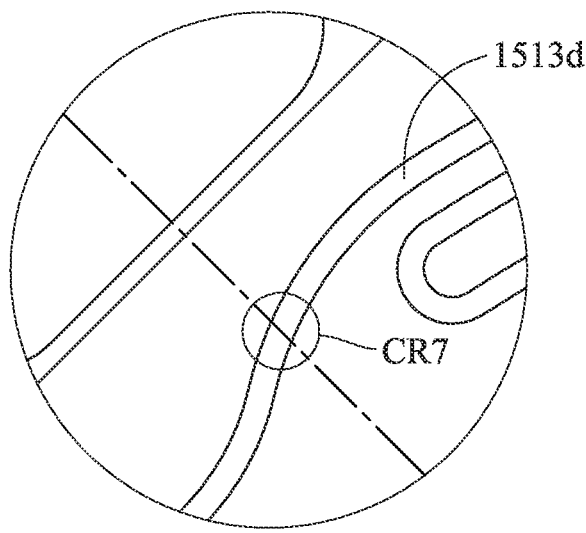
FIG. 57 is an enlarged view of region EL 25 in FIG. 56.
Figure 58:
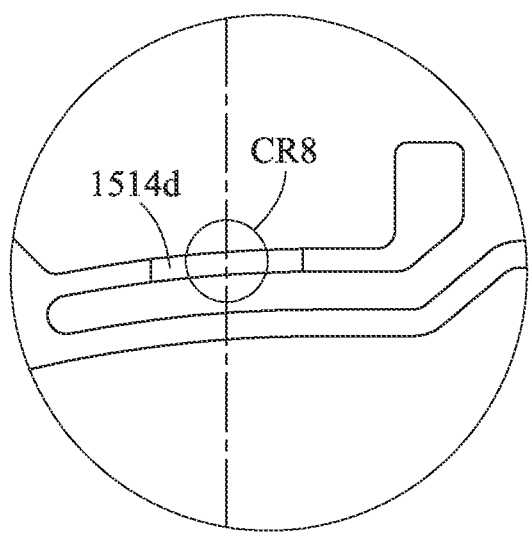
FIG. 58 is an enlarged view of region EL 26 in FIG. 56.
Figure 59:
FIG. 59 is a cross-sectional view of the metal elastic elements along line 59-59 in FIG. 56.
Figure 60:
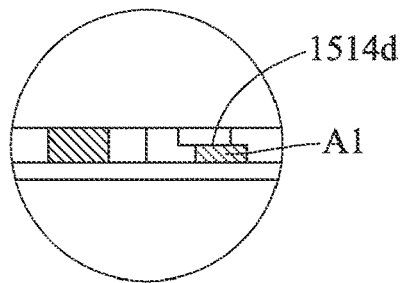
FIG. 60 is an enlarged view of region EL 27 in FIG. 59.
Figure 61:
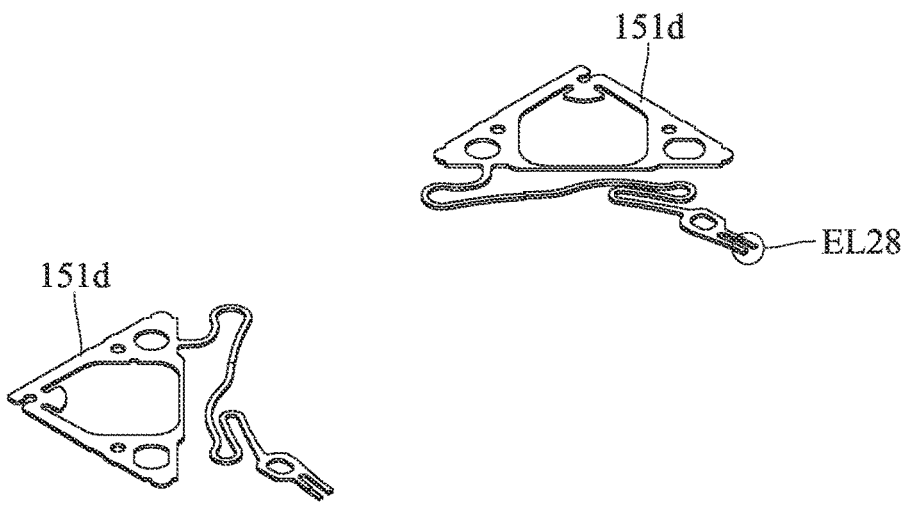
FIG. 61 a sectional view of the metal elastic elements along line 59-59 in FIG. 56.
Figure 62:
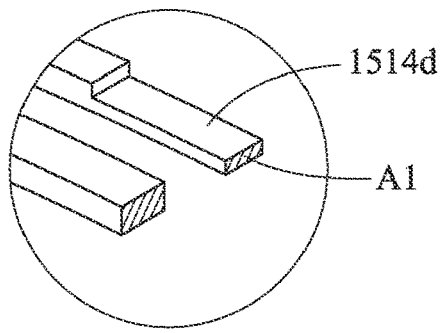
FIG. 62 is an enlarged view of region EL 28 in FIG. 61.
Figure 63:
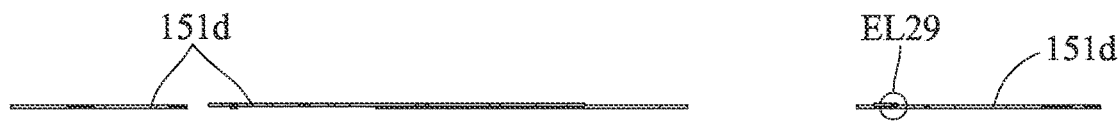
FIG. 63 is a cross-sectional view of the metal elastic elements along line 63-63 in FIG. 56.
Figure 64:
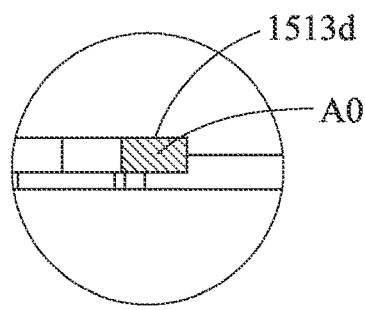
FIG. 64 is an enlarged view of region EL 29 in FIG. 63.
Figure 65:
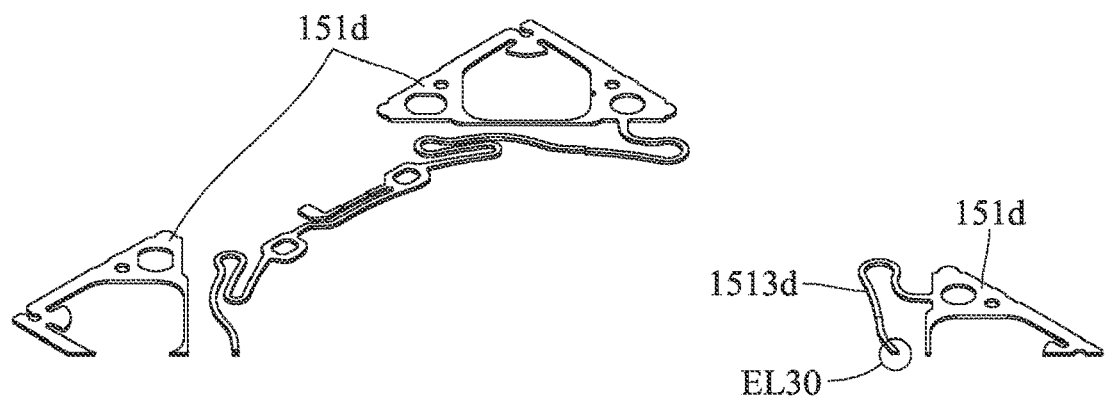
FIG. 65 a sectional view of the metal elastic elements along line 63-63 in FIG. 56.
Figure 66:
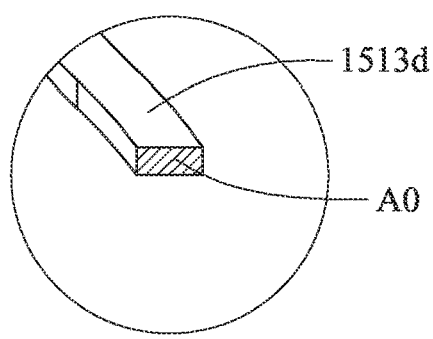
FIG. 66 is an enlarged view of region EL 30 in FIG. 65.

Please refer to FIG. 55 to FIG. 66. FIG. 55 is a perspective view of metal elastic elements of an imaging lens driving module according to the 4th embodiment of the present disclosure, FIG. 56 is a top view of the metal elastic elements in FIG. 55, FIG. 57 is an enlarged view of region EL 25 in FIG. 56, FIG. 58 is an enlarged view of region EL 26 in FIG. 56, FIG. 59 is a cross-sectional view of the metal elastic elements along line 59-59 in FIG. 56, FIG. 60 is an enlarged view of region EL 27 in FIG. 59, FIG. 61 a sectional view of the metal elastic elements along line 59-59 in FIG. 56, FIG. 62 is an enlarged view of region EL 28 in FIG. 61, FIG. 63 is a cross-sectional view of the metal elastic elements along line 63-63 in FIG. 56, FIG. 64 is an enlarged view of region EL 29 in FIG. 63, FIG. 65 a sectional view of the metal elastic elements along line 63-63 in FIG. 56, and FIG. 66 is an enlarged view of region EL 30 in FIG. 65.

In this embodiment, an imaging lens driving module 1d is provided. The imaging lens driving module 1d has a configuration similar to that of the imaging lens driving module 1 as disclosed in the 1st embodiment, and they are different from each other in that the structural feature of metal elastic elements 151d in this embodiment is different from that of the metal elastic elements 151 in the 1st embodiment. Said imaging lens driving modules of the two embodiments having similar configurations with each other refers to that except for the metal elastic elements, elements of one of the imaging lens driving modules have structural features, for example, the same as that of the other of the imaging lens driving modules.

In specific, in this embodiment, a minimum sectional area of a compensating elastic part 1514d of the metal elastic element 151d is different from the minimum sectional area of the compensating elastic part 1514 of the metal elastic element 151 which is disclosed in the 1st embodiment. In addition, the compensating elastic part 1514d of the metal elastic element 151d has a recess at its middle portion; that is, there is a step between the middle portion and two ends of the compensating elastic part 1514d.

In this embodiment, when a sectional area of an elastic part 1513d of the metal elastic element 151d is A0, and a minimum sectional area of the compensating elastic part 1514d of the metal elastic element 151d is A1, the following conditions are satisfied: A0=0.0030 mm$^2$; A1=0.0012 mm$^2$; and A1/A0=0.40. In addition, the compensating elastic part 1514d of the metal elastic element 151d has a minimum sectional area at its middle portion. Moreover, the position of the sectional area A1 of the compensating elastic part 1514d as shown in FIG. 60 and FIG. 62 is located at the section CR8 as shown in FIG. 58, and the position of the sectional area A0 of the elastic part 1513d as shown in FIG. 64 and FIG. 66 is located at the section CR7 as shown in FIG. 57.

5th Embodiment

Figure 67:
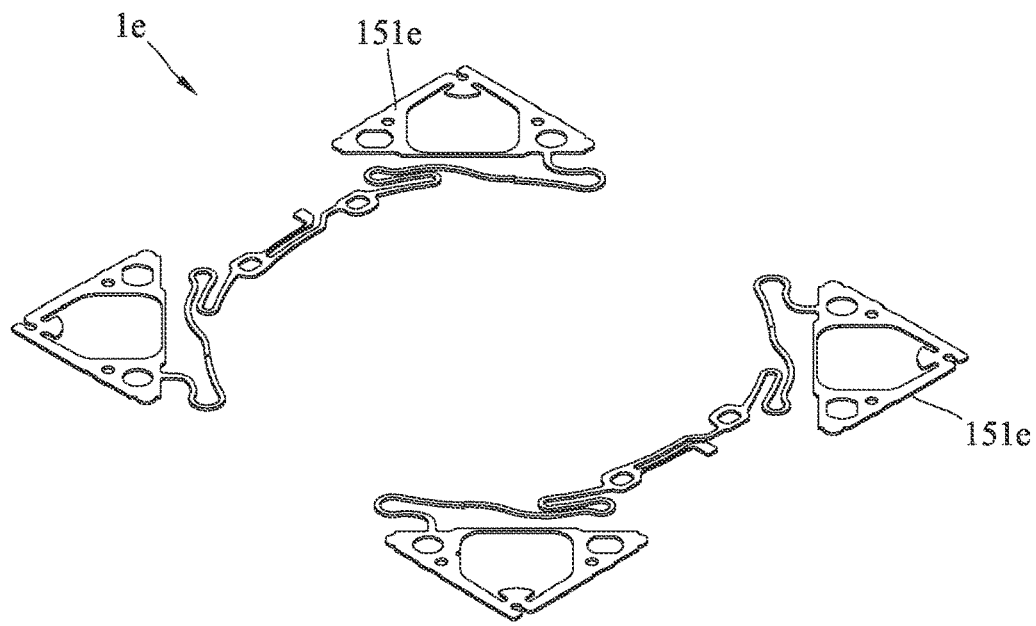
FIG. 67 is a perspective view of metal elastic elements of an imaging lens driving module according to the 5th embodiment of the present disclosure.
Figure 68:
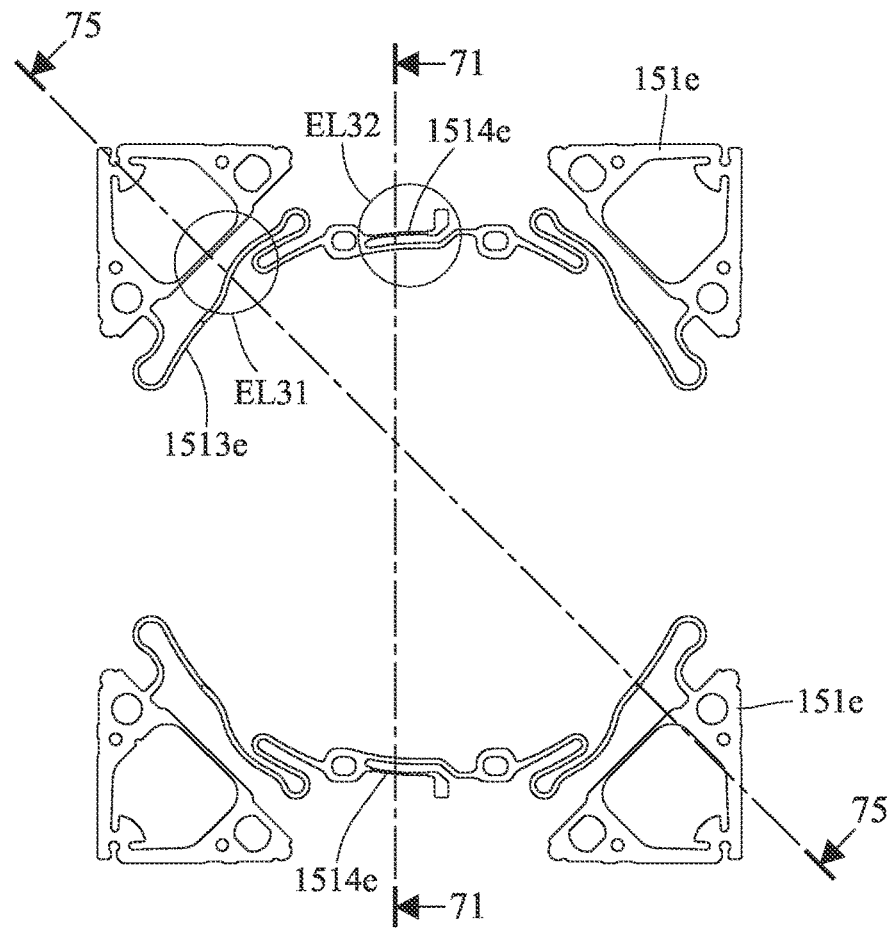
FIG. 68 is a top view of the metal elastic elements in FIG. 6.
Figure 69:
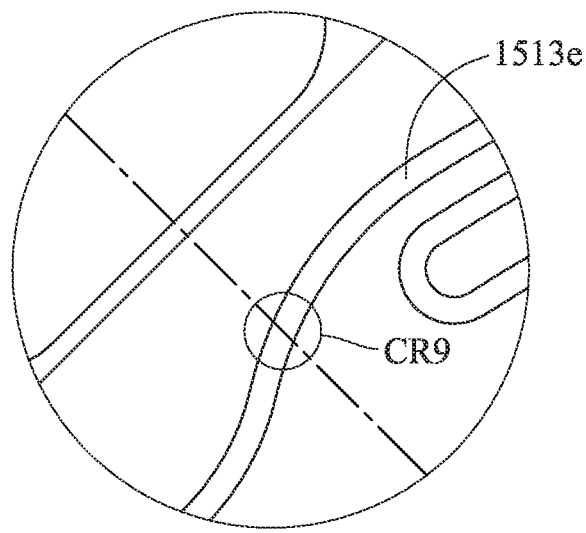
FIG. 69 is an enlarged view of region EL 31 in FIG. 68.
Figure 70:
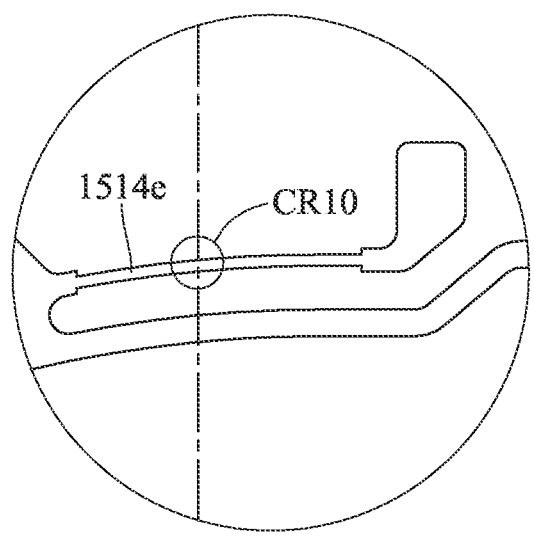
FIG. 70 is an enlarged view of region EL 32 in FIG. 68.
Figure 71:
FIG. 71 is a cross-sectional view of the metal elastic elements along line 71-71 in FIG. 68.
Figure 72:
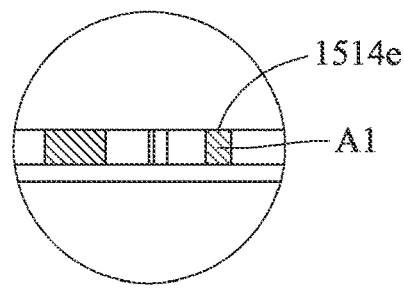
FIG. 72 is an enlarged view of region EL 33 in FIG. 71.
Figure 73:
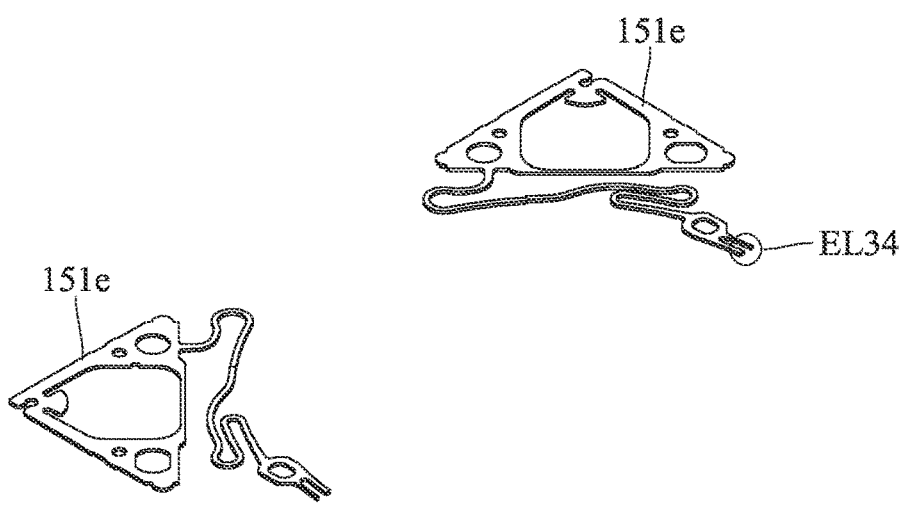
FIG. 73 a sectional view of the metal elastic elements along line 71-71 in FIG. 68.
Figure 74:
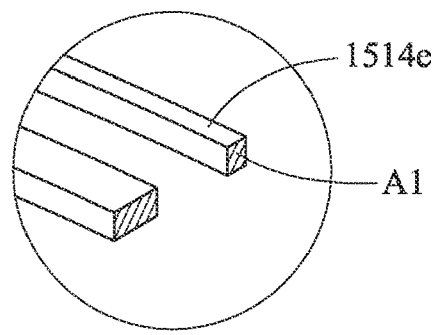
FIG. 74 is an enlarged view of region EL 34 in FIG. 73.
Figure 75:
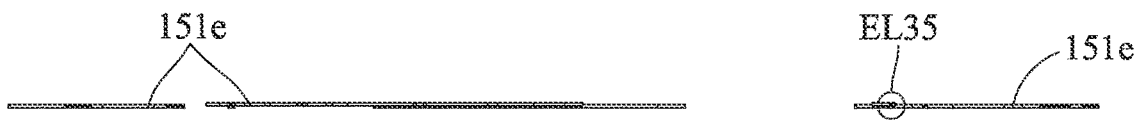
FIG. 75 is a cross-sectional view of the metal elastic elements along line 75-75 in FIG. 68.
Figure 76:
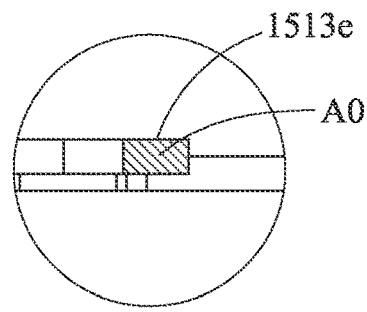
FIG. 76 is an enlarged view of region EL 35 in FIG. 75.
Figure 77:
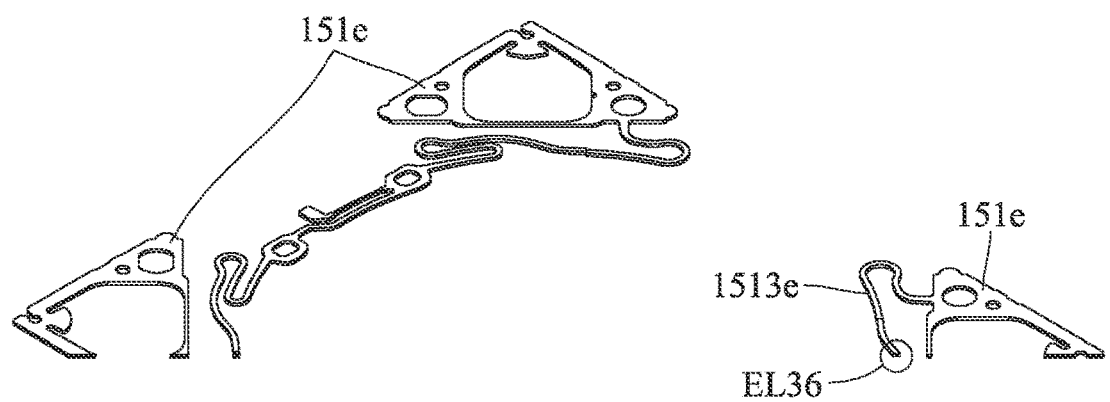
FIG. 77 a sectional view of the metal elastic elements along line 75-75 in FIG. 68.
Figure 78:
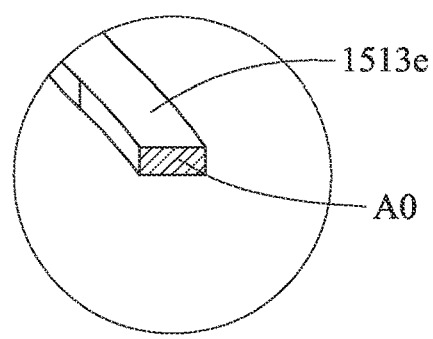
FIG. 78 is an enlarged view of region EL 36 in FIG. 77.

Please refer to FIG. 67 to FIG. 78. FIG. 67 is a perspective view of metal elastic elements of an imaging lens driving module according to the 5th embodiment of the present disclosure, FIG. 68 is a top view of the metal elastic elements in FIG. 6, FIG. 69 is an enlarged view of region EL 31 in FIG. 68, FIG. 70 is an enlarged view of region EL 32 in FIG. 68, FIG. 71 is a cross-sectional view of the metal elastic elements along line 71-71 in FIG. 68, FIG. 72 is an enlarged view of region EL 33 in FIG. 71, FIG. 73 a sectional view of the metal elastic elements along line 71-71 in FIG. 68, FIG. 74 is an enlarged view of region EL 34 in FIG. 73, FIG. 75 is a cross-sectional view of the metal elastic elements along line 75-75 in FIG. 68, FIG. 76 is an enlarged view of region EL 35 in FIG. 75, FIG. 77 a sectional view of the metal elastic elements along line 75-75 in FIG. 68, and FIG. 78 is an enlarged view of region EL 36 in FIG. 77.

In this embodiment, an imaging lens driving module 1e is provided. The imaging lens driving module 1e has a configuration similar to that of the imaging lens driving module 1 as disclosed in the 1st embodiment, and they are different from each other in that the structural feature of metal elastic elements 151e in this embodiment is different from that of the metal elastic elements 151 in the 1st embodiment. Said imaging lens driving modules of the two embodiments having similar configurations with each other refers to that except for the metal elastic elements, elements of one of the imaging lens driving modules have structural features, for example, the same as that of the other of the imaging lens driving modules.

In specific, in this embodiment, a minimum sectional area of a compensating elastic part 1514e of the metal elastic element 151e is different from the minimum sectional area of the compensating elastic part 1514 of the metal elastic element 151 which is disclosed in the 1st embodiment. In addition, the compensating elastic part 1514e of the metal elastic element 151e has two recesses respectively located on its two side surfaces at the middle portion thereof, and thus the sectional area of the middle portion of the compensating elastic part 1514e is reduced.

In this embodiment, when a sectional area of an elastic part 1513e of the metal elastic element 151e is A0, and a minimum sectional area of the compensating elastic part 1514e of the metal elastic element 151e is A1, the following conditions are satisfied: $A0=0.0030$ mm$^2$; $A1=0.0012$ mm$^2$; and $A1/A0=0.40$. In addition, the compensating elastic part 1514e of the metal elastic element 151e has a minimum sectional area at its middle portion. Moreover, the position of the sectional area A1 of the compensating elastic part 1514e as shown in FIG. 72 and FIG. 74 is located at the section CR10 as shown in FIG. 70, and the position of the sectional area A0 of the elastic part 1513e as shown in FIG. 76 and FIG. 78 is located at the section CR9 as shown in FIG. 69.

6th Embodiment

Figure 79:
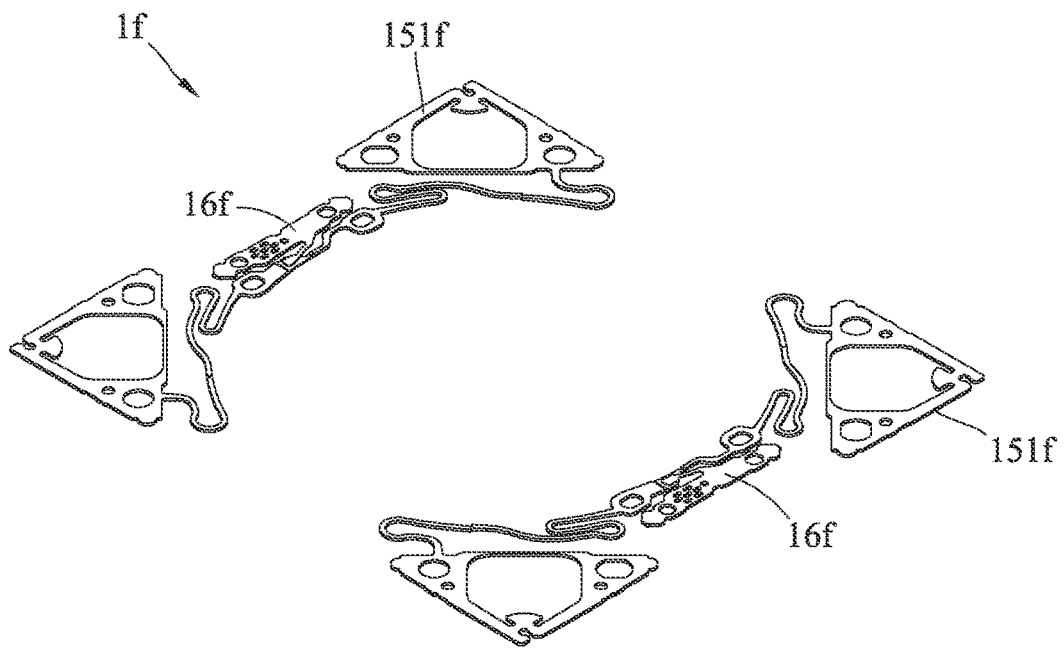
FIG. 79 is a perspective view of metal elastic elements and metal conductive elements of an imaging lens driving module according to the 6th embodiment of the present disclosure.
Figure 82:
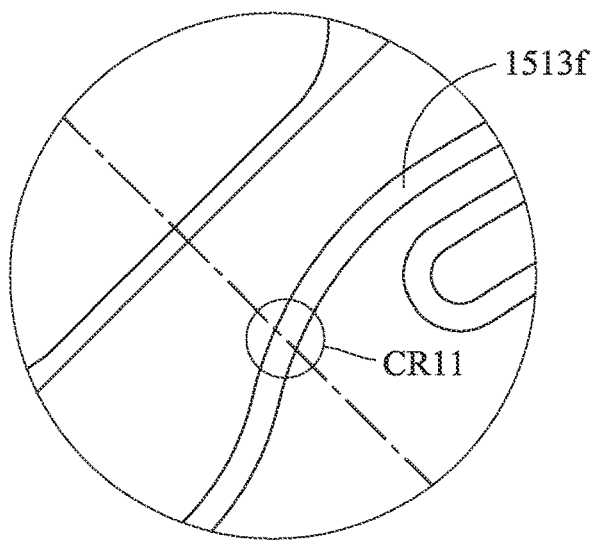
FIG. 82 is an enlarged view of region EL 37 in FIG. 81.
Figure 83:
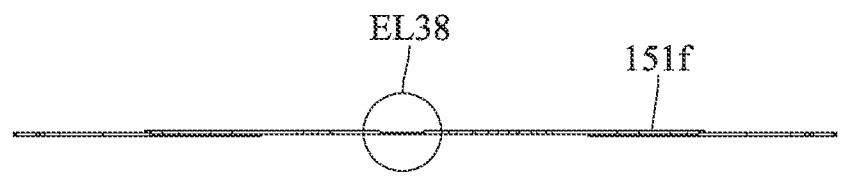
FIG. 83 is a cross-sectional view of the metal elastic elements along line 83-83 in FIG. 81.
Figure 85:
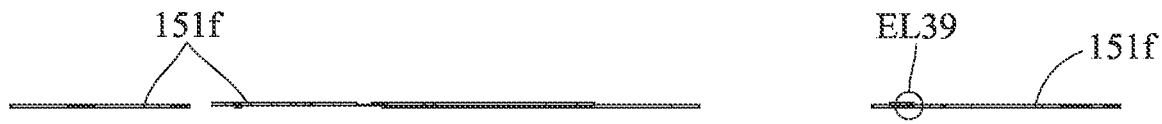
FIG. 85 is a cross-sectional view of the metal elastic elements along line 85-85 in FIG. 81.
Figure 86:
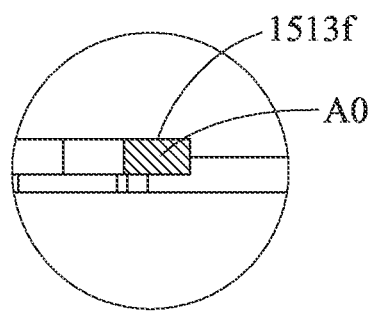
FIG. 86 is an enlarged view of region EL 39 in FIG. 85.
Figure 88:
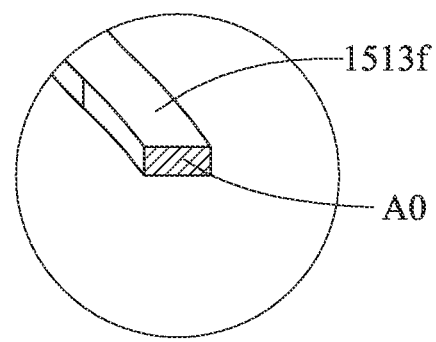
FIG. 88 is an enlarged view of region EL 40 in FIG. 87.
Figure 89:
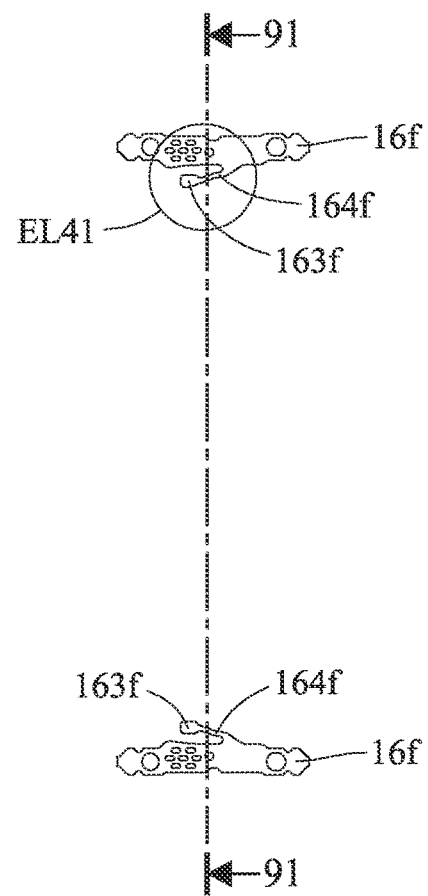
FIG. 89 is a top view of the metal conductive elements in FIG. 79.
Figure 90:
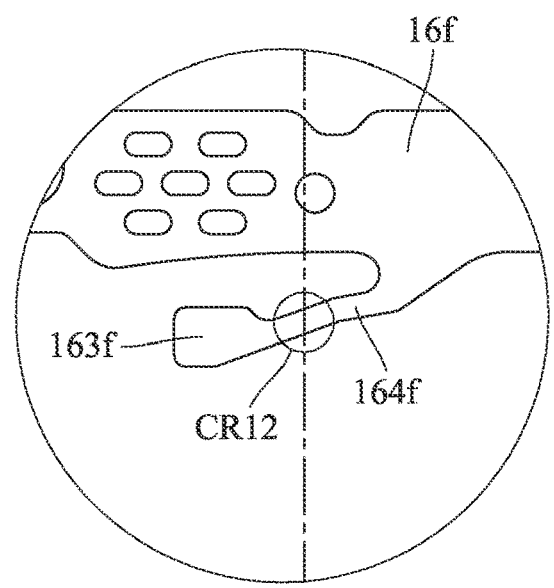
FIG. 90 is an enlarged view of region EL 41 in FIG. 89.
Figure 91:
FIG. 91 is a cross-sectional view of the metal conductive elements along line 91-91 in FIG. 89.
Figure 92:
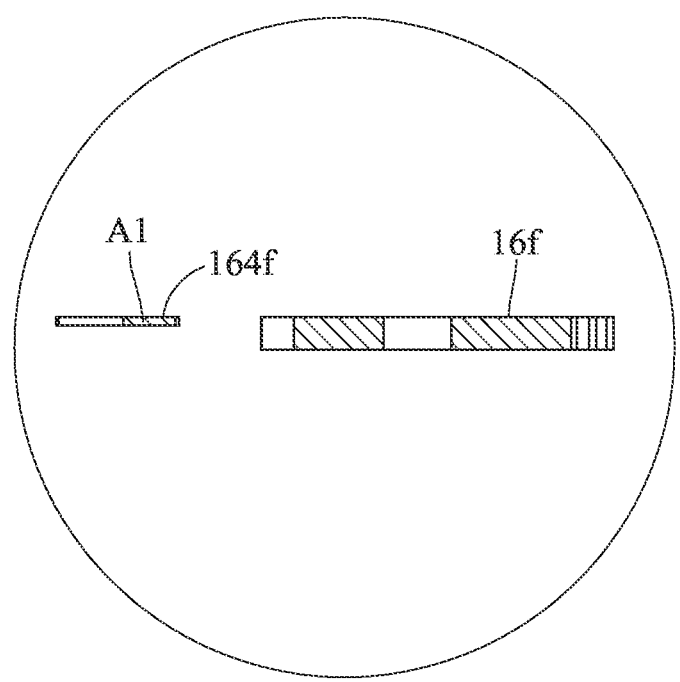
FIG. 92 is an enlarged view of region EL 42 in FIG. 91.
Figure 93:
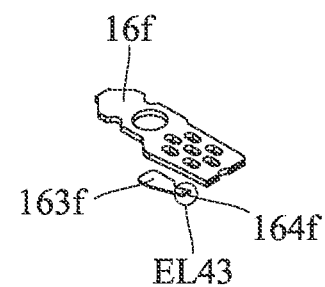
FIG. 93 a sectional view of the metal conductive elements along line 91-91 in FIG. 89.
Figure 93:
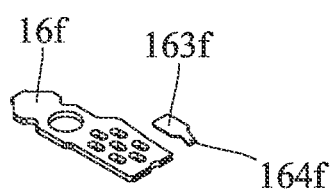
Figure 94:
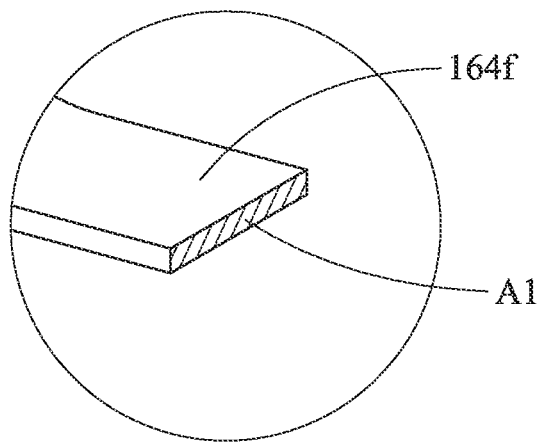
FIG. 94 is an enlarged view of region EL 43 in FIG. 93.

Please refer to FIG. 79 to FIG. 94. FIG. 79 is a perspective view of metal elastic elements and metal conductive elements of an imaging lens driving module according to the 6th embodiment of the present disclosure, FIG. 80 is a top view of the metal elastic elements and the metal conductive elements in FIG. 79, FIG. 81 is a top view of the metal elastic elements in FIG. 79, FIG. 82 is an enlarged view of region EL 37 in FIG. 81, FIG. 83 is a cross-sectional view of the metal elastic elements along line 83-83 in FIG. 81, FIG. 84 is an enlarged view of region EL 38 in FIG. 83, FIG. 85 is a cross-sectional view of the metal elastic elements along line 85-85 in FIG. 81, FIG. 86 is an enlarged view of region EL 39 in FIG. 85, FIG. 87 a sectional view of the metal elastic elements along line 85-85 in FIG. 81, FIG. 88 is an enlarged view of region EL 40 in FIG. 87, FIG. 89 is a top view of the metal conductive elements in FIG. 79, FIG. 90 is an enlarged view of region EL 41 in FIG. 89, FIG. 91 is a cross-sectional view of the metal conductive elements along line 91-91 in FIG. 89, FIG. 92 is an enlarged view of region EL 42 in FIG. 91, FIG. 93 a sectional view of the metal conductive elements along line 91-91 in FIG. 89, and FIG. 94 is an enlarged view of region EL 43 in FIG. 93.

In this embodiment, an imaging lens driving module 1f is provided. The imaging lens driving module 1f has a configuration similar to that of the imaging lens driving module 1 as disclosed in the 1st embodiment, and the they are different from each other in that the structural feature of metal conductive elements 16f and metal elastic elements 151f in this embodiment is different from that of the metal conductive elements 16 and the metal elastic elements 151 in the 1st embodiment. Said imaging lens driving modules of the two embodiments having similar configurations with each other refers to that except for the metal conductive elements and the metal elastic elements, elements of one of the imaging lens driving modules have structural features, for example, the same as that of the other of the imaging lens driving modules.

Figure 80:
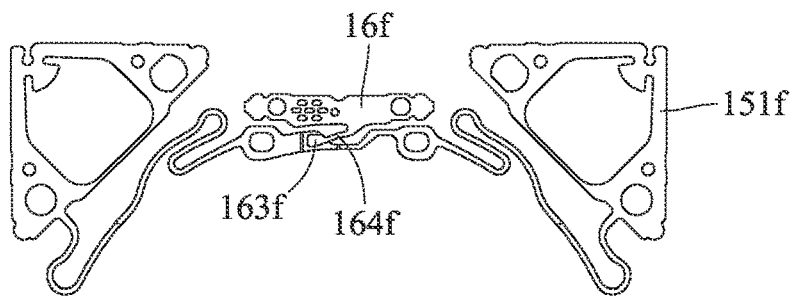
FIG. 80 is a top view of the metal elastic elements and the metal conductive elements in FIG. 79.
Figure 80:
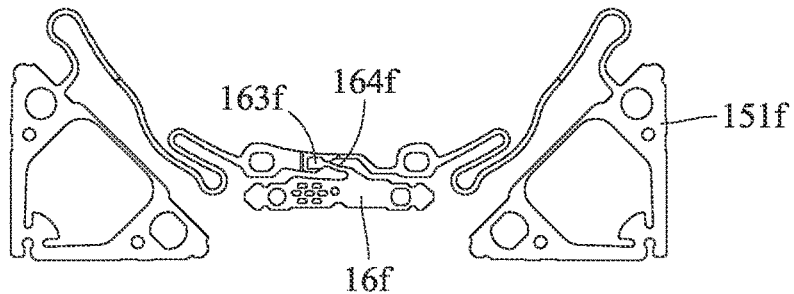
Figure 81:
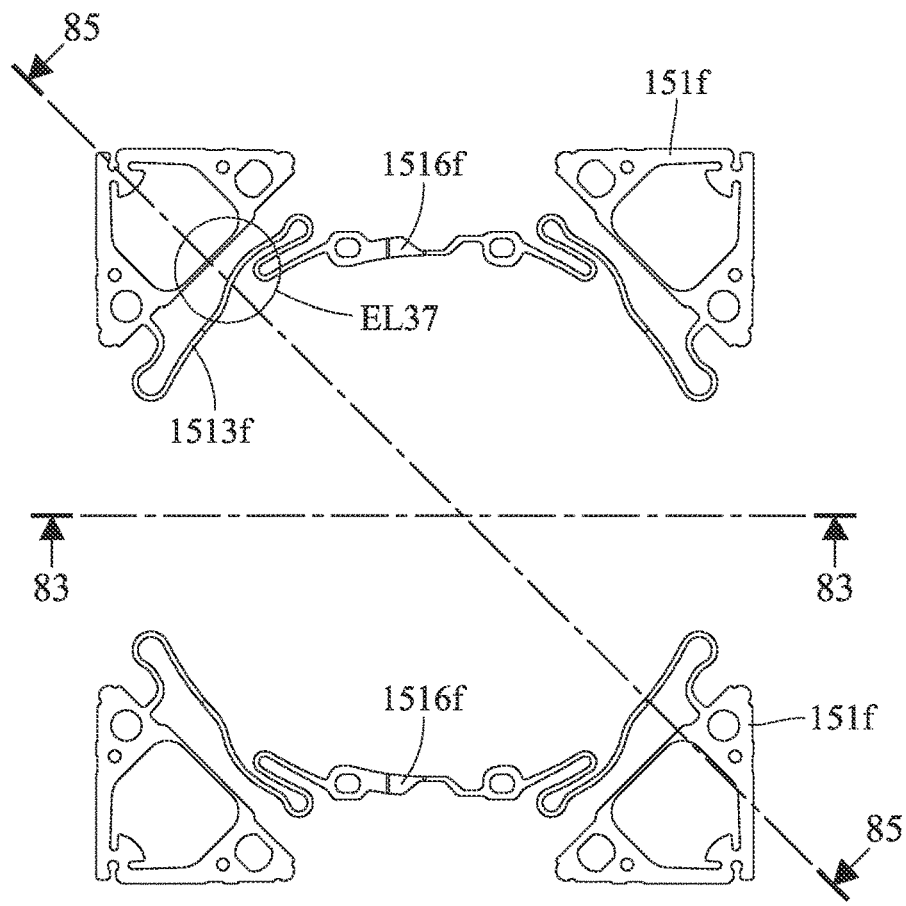
FIG. 81 is a top view of the metal elastic elements in FIG. 79.

In specific, as shown in FIG. 79 to FIG. 81, in this embodiment, each of the two metal conductive elements 16f includes an electrically connecting part 163f and a compensating elastic part 164f connected to the electrically connecting part 163f. The two metal elastic elements 151f are disposed between a lens carrier (not shown in figure) and respective electrically connecting parts 163f of the metal conductive elements 16f, and each of the metal elastic elements 151f has a corresponsive surface 1516f. The corresponsive surfaces 1516f of the metal elastic elements 151f are disposed corresponding to and electrically connected to respective electrically connecting parts 163f of the metal conductive elements 16f. In addition, the metal conductive elements 16f are served as wires for electrically connection between a coil (not shown in figure) and the metal elastic element 151f of the driving mechanism. Furthermore, the electrically connecting parts 163f of the metal conductive elements 16f overlap and are in physical contact with respective corresponsive surfaces 1516f of the metal elastic elements 151f in a direction parallel to an optical axis.

Figure 84:
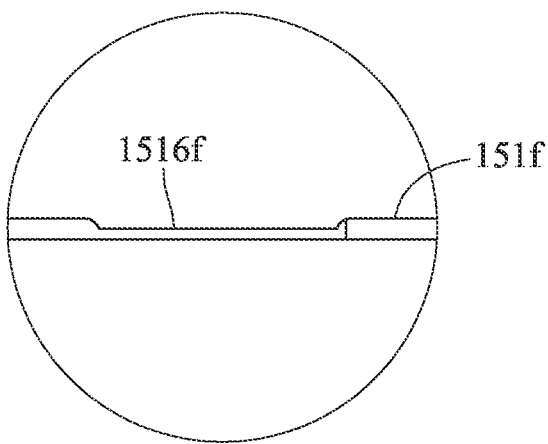
FIG. 84 is an enlarged view of region EL 38 in FIG. 83.
Figure 87:
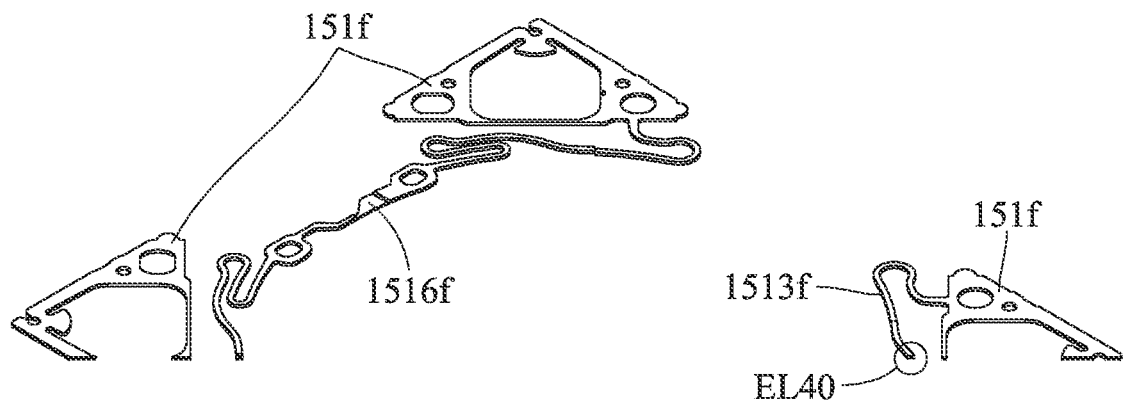
FIG. 87 a sectional view of the metal elastic elements along line 85-85 in FIG. 81.

In this embodiment, as shown in FIG. 81, FIG. 84 and FIG. 87, each of the corresponsive surfaces 1516f of the metal elastic elements 151f is a compatible step surface having a structure of a recessed surface area.

In this embodiment, when a sectional area of an elastic part 1513f of the metal elastic element 151f is A0, and a minimum sectional area of the compensating elastic part 164f of the metal conductive element 16f is A1, the following conditions are satisfied: $A0=0.0030$ mm$^2$; $A1=0.0006$ mm$^2$; and $A1/A0=0.20$. In addition, the position of the sectional area A1 of the compensating elastic part 164f as shown in FIG. 92 and FIG. 94 is located at the section CR12 as shown in FIG. 90, and the position of the sectional area A0 of the elastic part 1513f as shown in FIG. 86 and FIG. 88 is located at the section CR11 as shown in FIG. 82.

7th Embodiment

Figure 95:
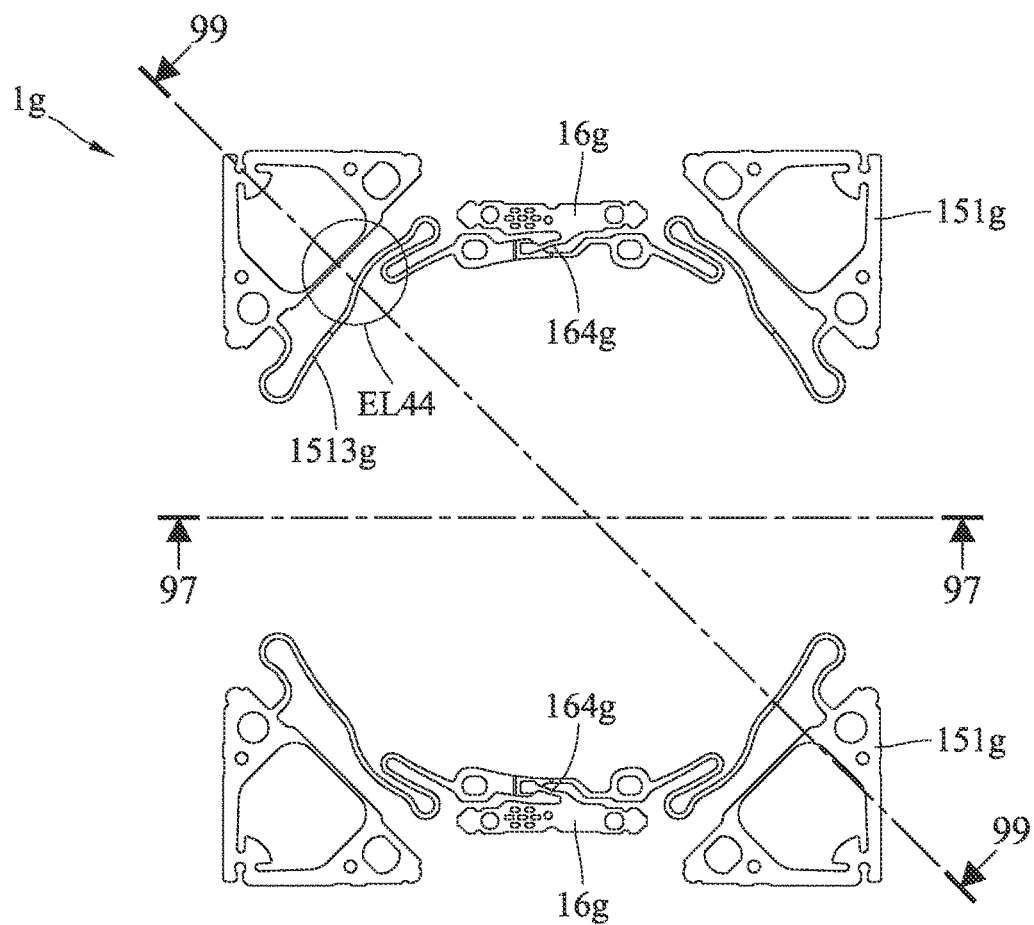
FIG. 95 is a top view of metal elastic elements and metal conductive elements of an imaging lens driving module according to the 7th embodiment of the present disclosure.
Figure 96:
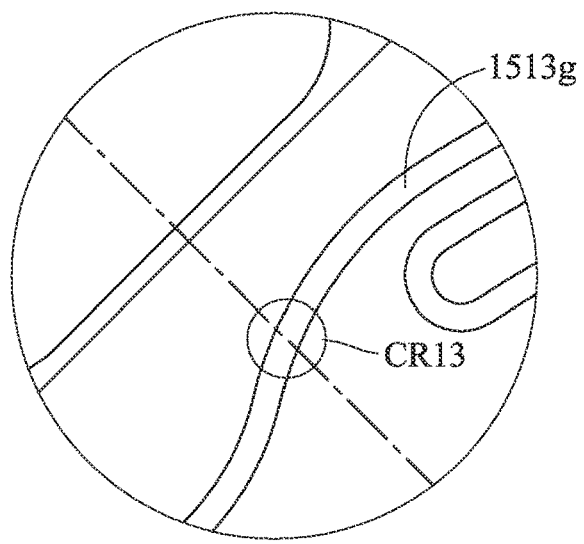
FIG. 96 is an enlarged view of region EL 44 in FIG. 95.
Figure 97:
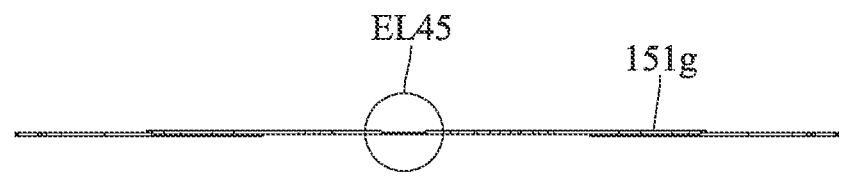
FIG. 97 is a cross-sectional view of the metal elastic elements along line 97-97 in FIG. 95.
Figure 98:
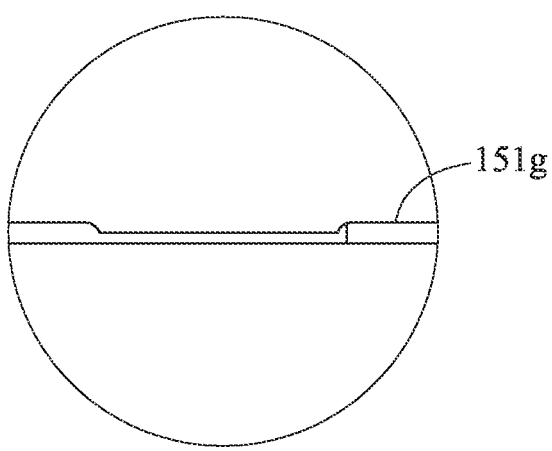
FIG. 98 is an enlarged view of region EL 45 in FIG. 97.
Figure 99:
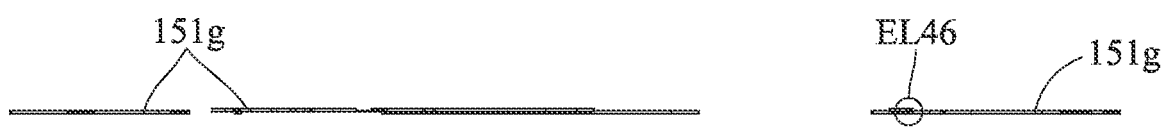
FIG. 99 is a cross-sectional view of the metal elastic elements along line 99-99 in FIG. 95.
Figure 100:
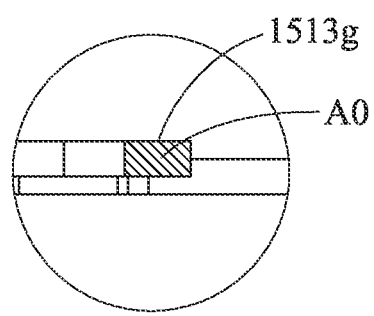
FIG. 100 is an enlarged view of region EL 46 in FIG. 99.
Figure 101:
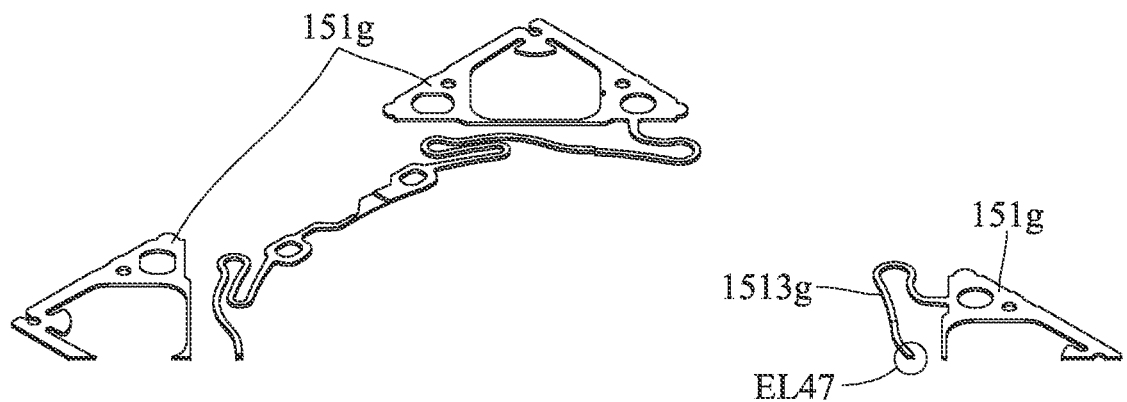
FIG. 101 a sectional view of the metal elastic elements along line 99-99 in FIG. 95.
Figure 102:
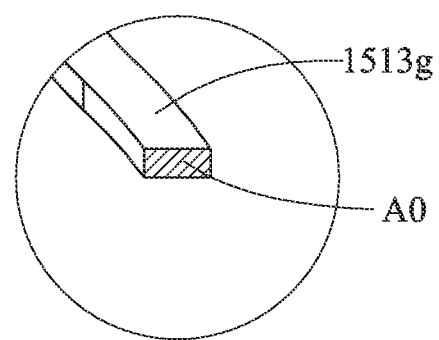
FIG. 102 is an enlarged view of region EL 47 in FIG. 101.
Figure 103:
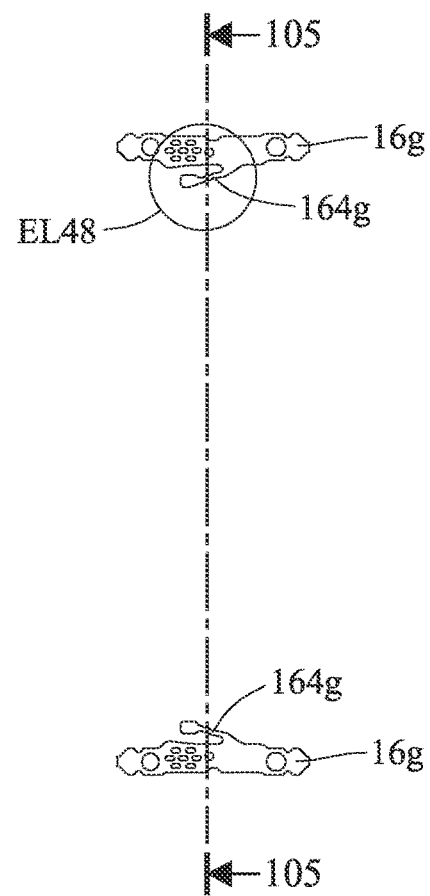
FIG. 103 is a top view of the metal conductive elements in FIG. 95.
Figure 104:
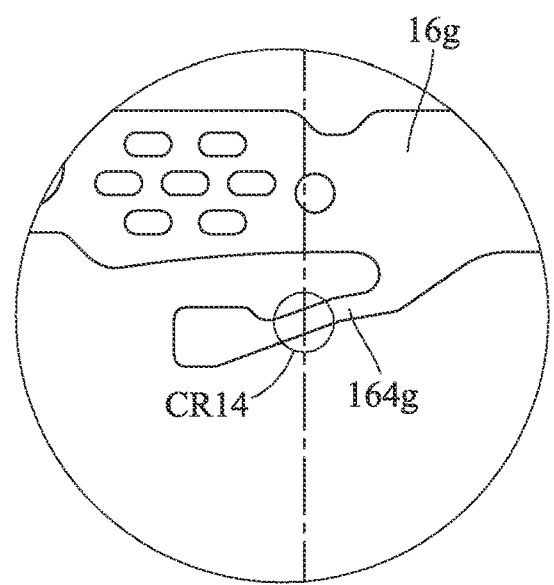
FIG. 104 is an enlarged view of region EL 48 in FIG. 103.
Figure 105:
FIG. 105 is a cross-sectional view of the metal conductive elements along line 105-150 in FIG. 103.
Figure 106:
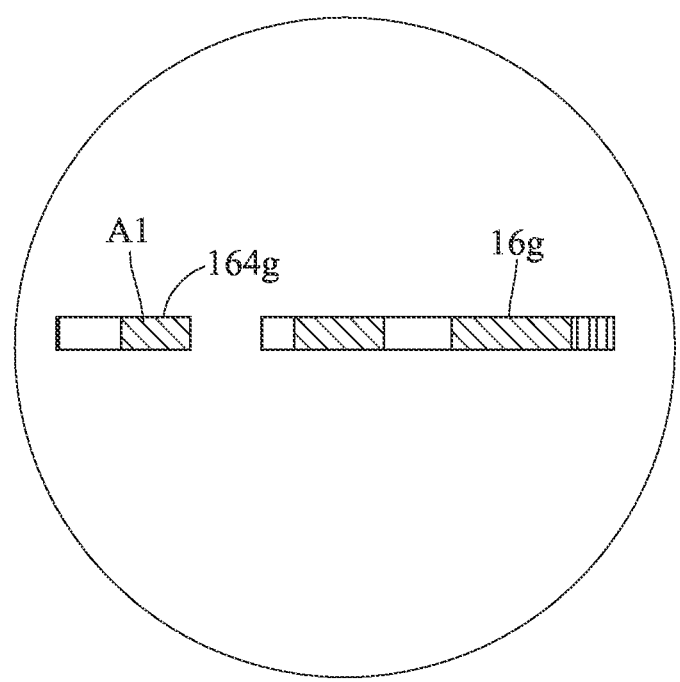
FIG. 106 is an enlarged view of region EL 49 in FIG. 105.
Figure 107:
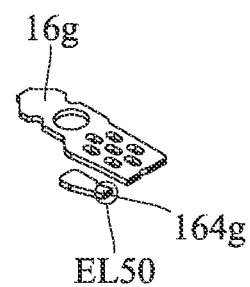
FIG. 107 a sectional view of the metal conductive elements along line 105-105 in FIG. 103.
Figure 107:
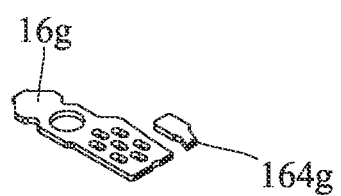
Figure 108:
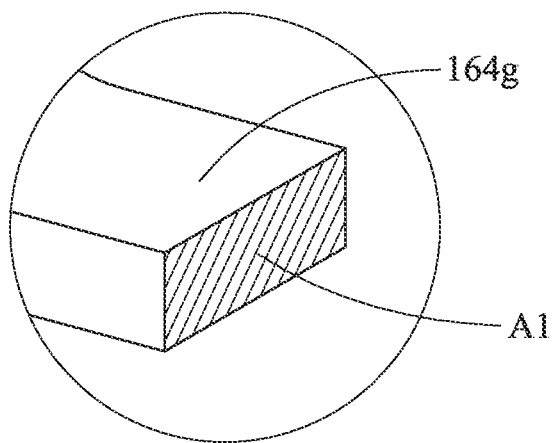
FIG. 108 is an enlarged view of region EL 50 in FIG. 107.

Please refer to FIG. 95 to FIG. 108. FIG. 95 is a top view of metal elastic elements and metal conductive elements of an imaging lens driving module according to the 7th embodiment of the present disclosure, FIG. 96 is an enlarged view of region EL 44 in FIG. 95, FIG. 97 is a cross-sectional view of the metal elastic elements along line 97-97 in FIG. 95, FIG. 98 is an enlarged view of region EL 45 in FIG. 97, FIG. 99 is a cross-sectional view of the metal elastic elements along line 99-99 in FIG. 95, FIG. 100 is an enlarged view of region EL 46 in FIG. 99, FIG. 101 a sectional view of the metal elastic elements along line 99-99 in FIG. 95, FIG. 102 is an enlarged view of region EL 47 in FIG. 101, FIG. 103 is a top view of the metal conductive elements in FIG. 95, FIG. 104 is an enlarged view of region EL 48 in FIG. 103, FIG. 105 is a cross-sectional view of the metal conductive elements along line 105-150 in FIG. 103, FIG. 106 is an enlarged view of region EL 49 in FIG. 105, FIG. 107 a sectional view of the metal conductive elements along line 105-105 in FIG. 103, and FIG. 108 is an enlarged view of region EL 50 in FIG. 107.

In this embodiment, an imaging lens driving module 1g is provided. The imaging lens driving module 1g has a configuration similar to that of the imaging lens driving module 1f as disclosed in the 6th embodiment, and they are different from each other in that the structural feature of metal conductive elements 16g in this embodiment is different from that of the metal conductive elements 16f in the 6th embodiment. Said imaging lens driving modules of the two embodiments having similar configurations with each other refers to that except for the metal conductive elements, elements of one of the imaging lens driving modules have structural features, for example, the same as that of the other of the imaging lens driving modules.

In specific, in this embodiment, a minimum sectional area of a compensating elastic part 164g of the metal conductive element 16g is different from the minimum sectional area of the compensating elastic part 164f of the metal conductive element 16f which is disclosed in the 6th embodiment.

In this embodiment, when a sectional area of an elastic part 1513g of the metal elastic element 151g is A0, and the minimum sectional area of the compensating elastic part 164g of the metal conductive element 16g is A1, the following conditions are satisfied: A0=0.0030 mm$^2$; A1=0.0034 mm$^2$; and A1/A0=1.13. In addition, the position of the sectional area A1 of the compensating elastic part 164g as shown in FIG. 106 and FIG. 108 is located at the section CR14 as shown in FIG. 104, and the position of the sectional area A0 of the elastic part 1513g as shown in FIG. 100 and FIG. 102 is located at the section CR13 as shown in FIG. 96.

8th Embodiment

Figure 109:
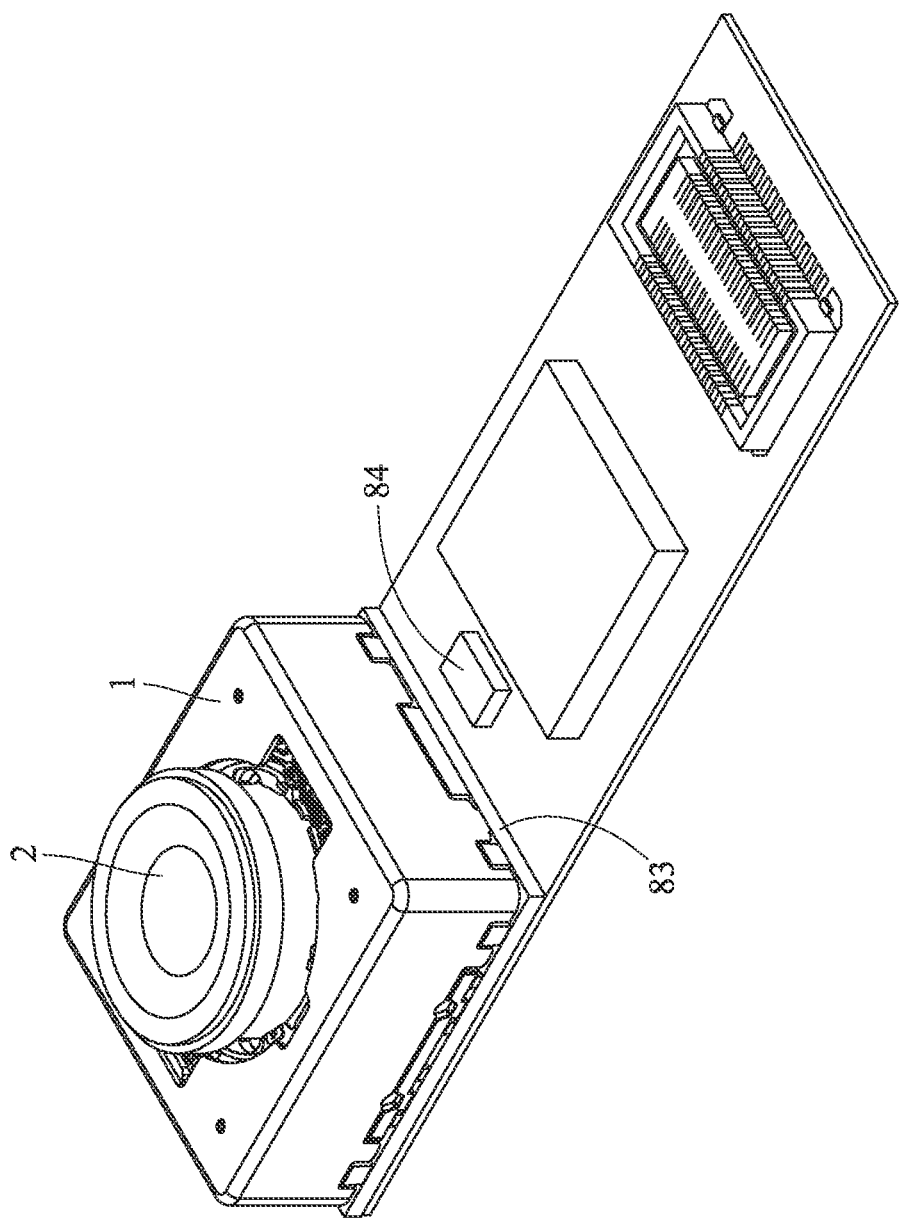
FIG. 109 is a perspective view of an image capturing unit according to the 8th embodiment of the present disclosure.

Please refer to FIG. 109, which is a perspective view of an image capturing unit according to the 8th embodiment of the present disclosure. In this embodiment, an image capturing unit 80 is a camera module including the imaging lens driving module 1 as disclosed in the 1st embodiment, an imaging lens system 2, an image sensor 83 and an image stabilizer 84. However, in other configurations, the image capturing unit 80 may include the imaging lens driving module in one of the 2nd embodiment through the 7th embodiment, and the present disclosure is not limited thereto. The imaging light converges in the imaging lens system 2 to generate an image with the driving mechanism 15 of the imaging lens driving module 1 utilized for image focusing on an image surface of the imaging lens system 2 and the image sensor 83, and the generated image is then digitally transmitted to other electronic component for further processing.

The driving mechanism 15 is favorable for obtaining a better imaging position of the imaging lens system 2, so that a clear and sharp image of the imaged object can be captured by the imaging lens system 2 in different object distances. In addition, the image capturing unit 80 can be provided with the image sensor 83 (for example, CMOS or CCD), which can feature high photosensitivity and low noise, disposed on the image surface of the imaging lens system 2 to provide higher image quality.

The image stabilizer 84, such as an accelerometer, a gyro sensor and a Hall Effect sensor, is configured to work with the driving mechanism 15 to provide optical image stabilization (OIS). The driving mechanism 15 working with the image stabilizer 84 is favorable for compensating for pan and tilt of the imaging lens system 2 to reduce blurring associated with motion during exposure. In some cases, the compensation can be provided by electronic image stabilization (EIS) with image processing software, thereby improving image quality while in motion or low-light conditions.

Figure 110:
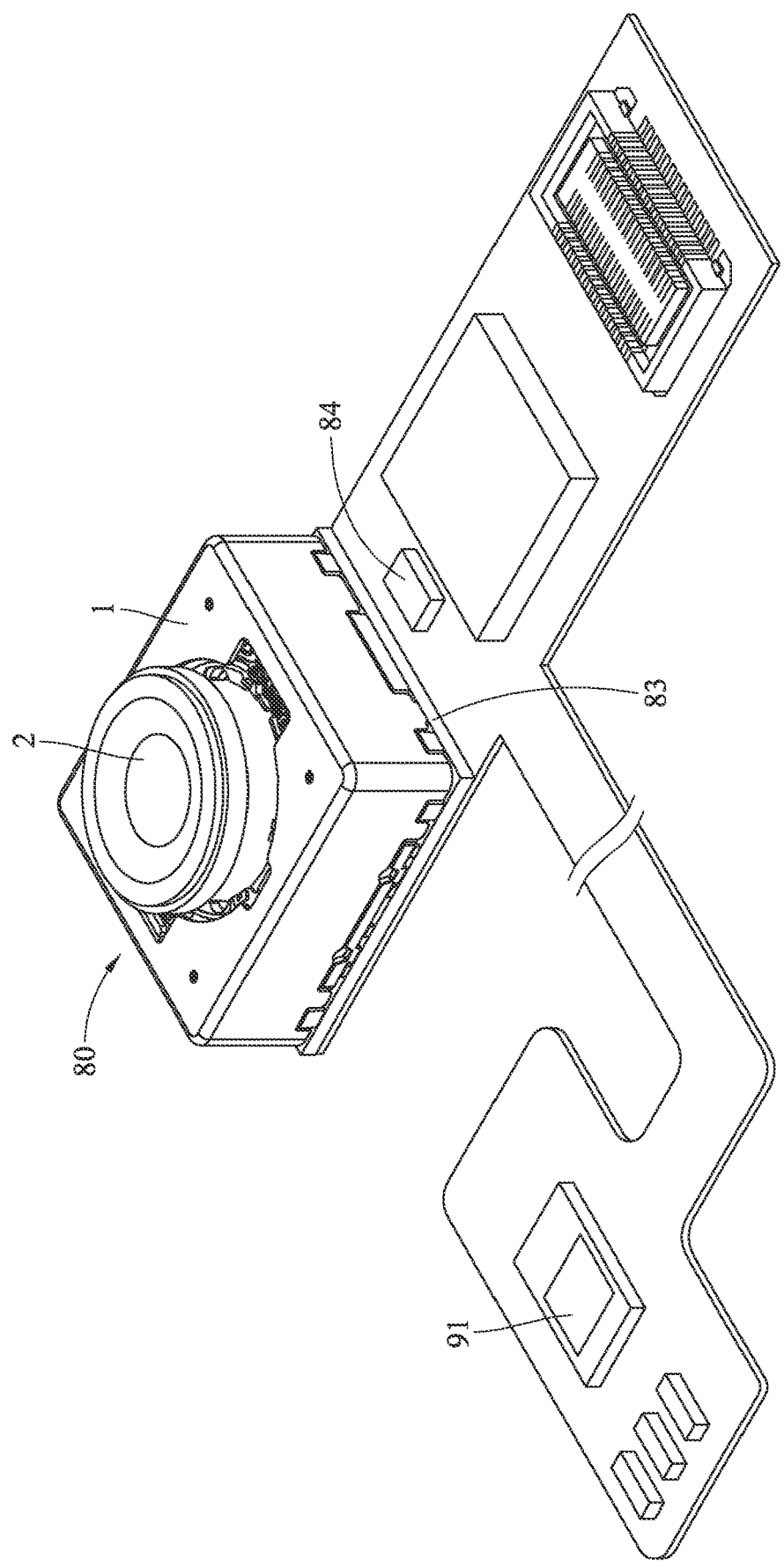
FIG. 110 is a perspective view of another image capturing unit according to one embodiment of the present disclosure.

The present disclosure is not limited to the image capturing unit 80 in FIG. 109. FIG. 110 is a perspective view of another image capturing unit according to one embodiment of the present disclosure, wherein the image capturing unit 80 further includes a flash module 91, which can be activated for light supplement when capturing images to improve image quality.

Figure 111:
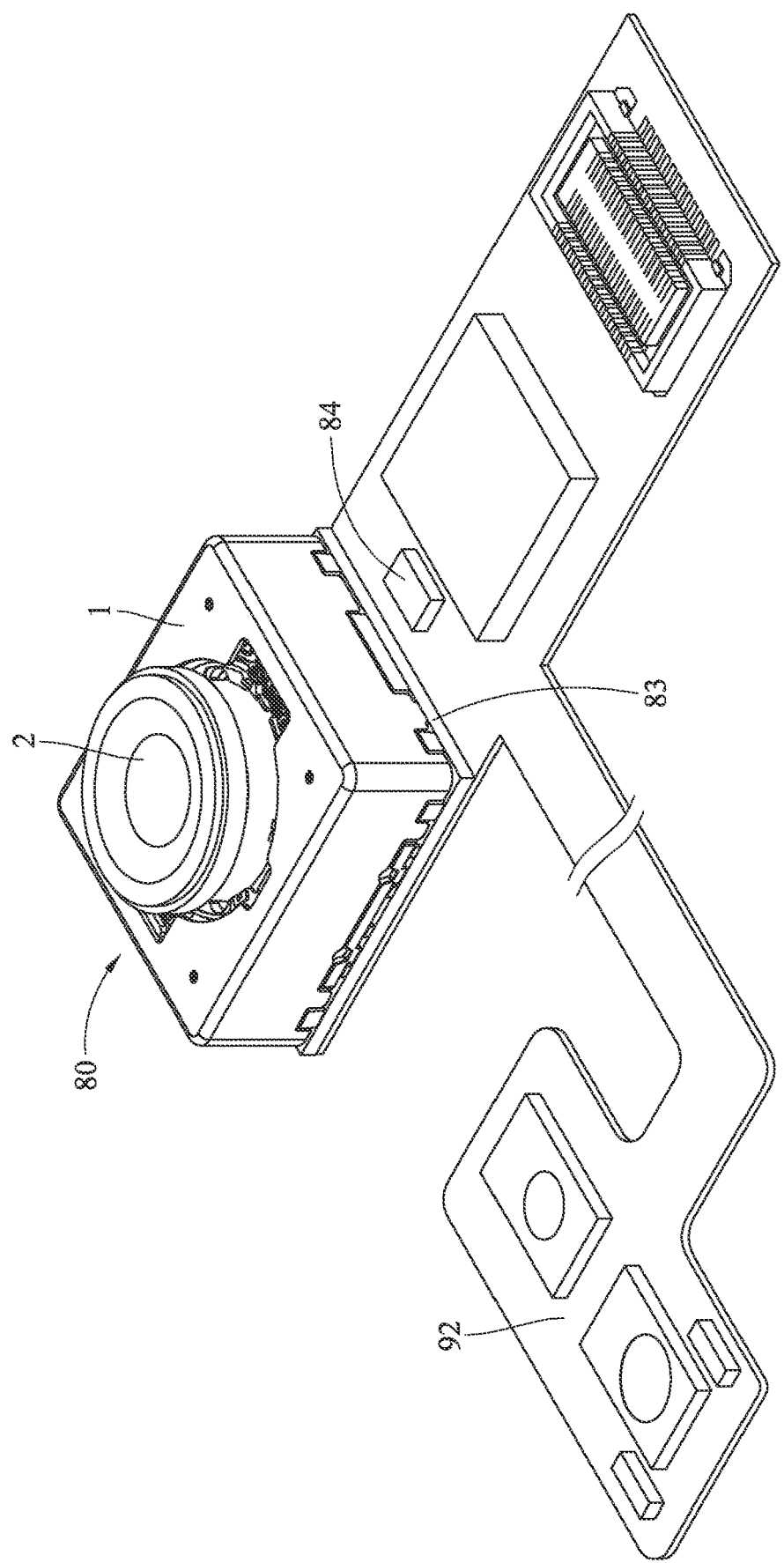
FIG. 111 is a perspective view of another image capturing unit according to one embodiment of the present disclosure.

FIG. 111 is a perspective view of still another image capturing unit according to one embodiment of the present disclosure, wherein the image capturing unit 80 further includes a focus assist module 92 configured to detect an object distance to achieve fast auto focusing. The light beam emitted from the focus assist module 92 can be either conventional infrared or laser.

9th Embodiment

Figure 112:
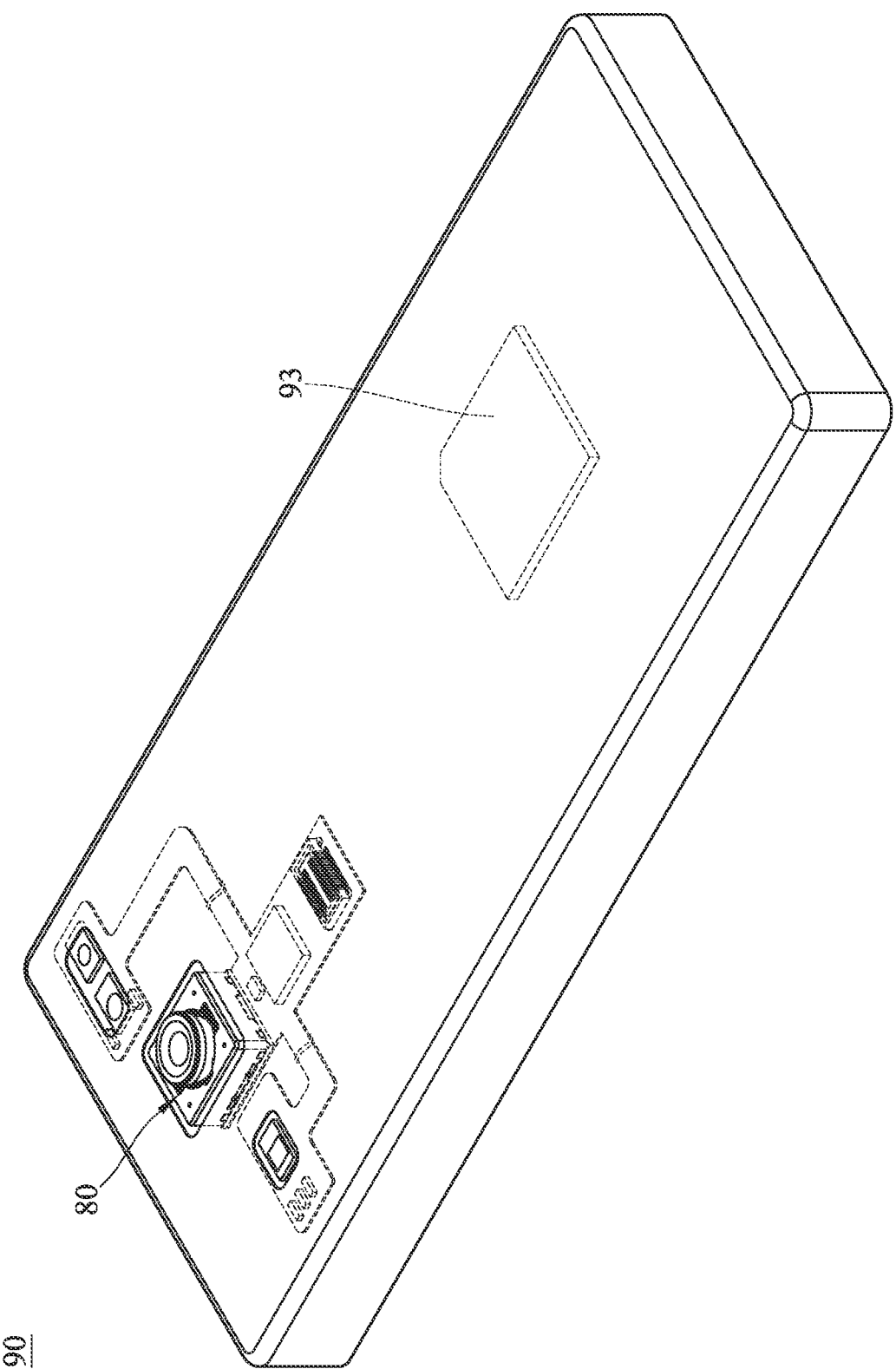
FIG. 112 is one perspective view of an electronic device according to the 9th embodiment of the present disclosure.
Figure 113:
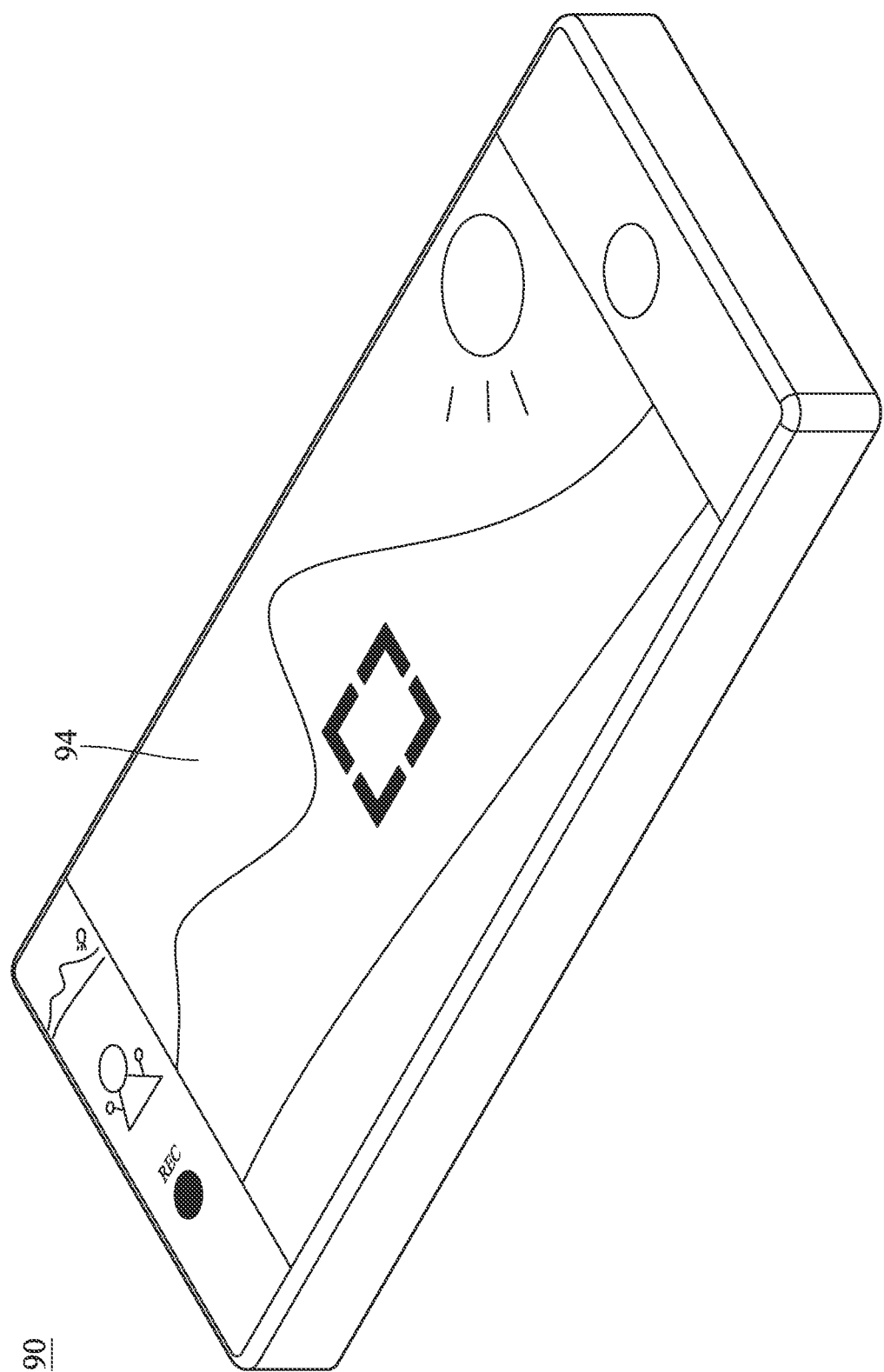
FIG. 113 is another perspective view of the electronic device in FIG. 112.
Figure 114:
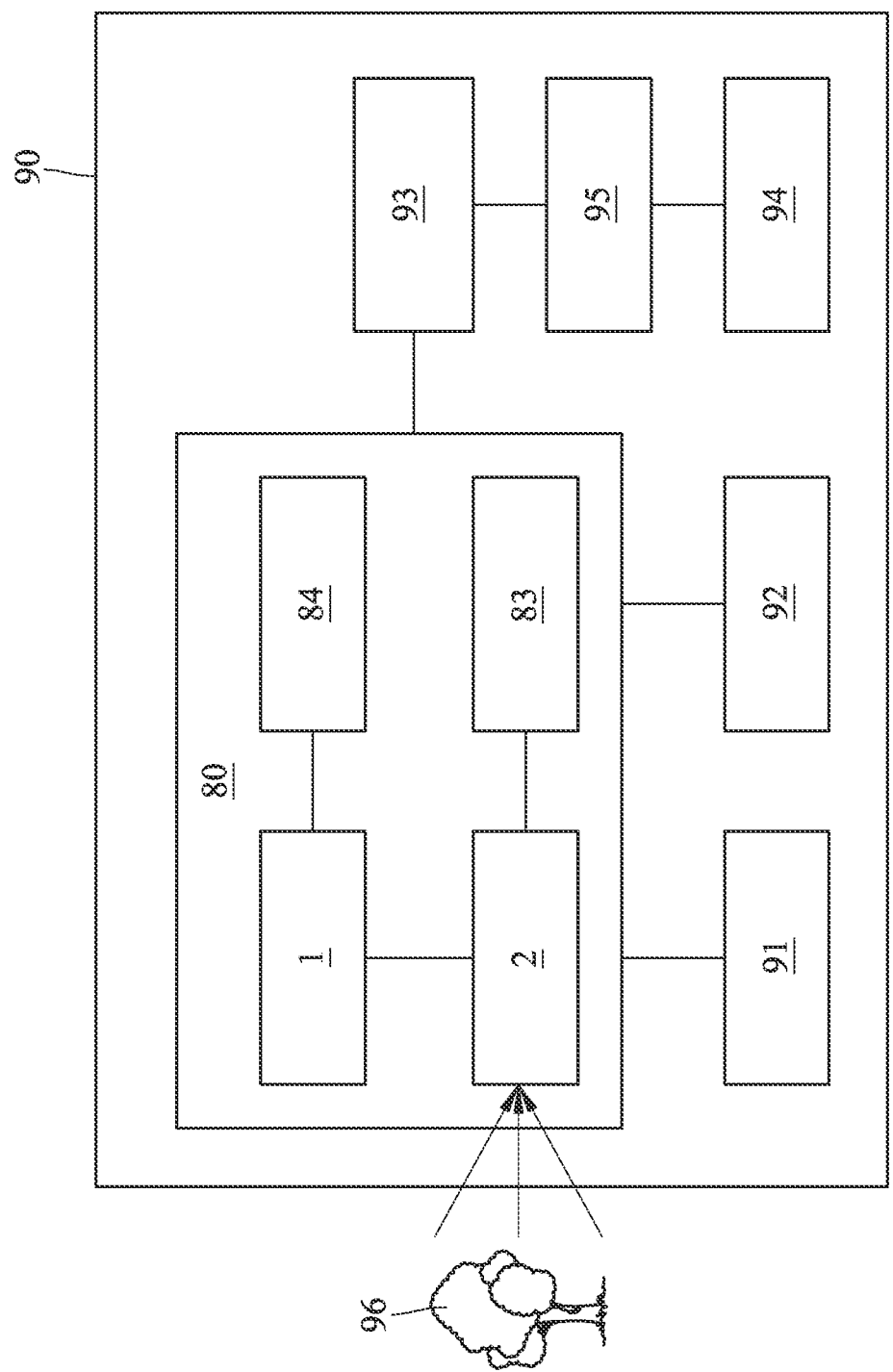
FIG. 114 is a block diagram of the electronic device in FIG. 112.

Please refer to FIG. 112 to FIG. 114. FIG. 112 is one perspective view of an electronic device according to the 9th embodiment of the present disclosure, FIG. 113 is another perspective view of the electronic device in FIG. 112, and FIG. 114 is a block diagram of the electronic device in FIG. 112.

In this embodiment, an electronic device 90 is a smartphone including the image capturing unit 80 disclosed in the 8th embodiment, an image signal processor 93, a display module (user interface) 94 and an image software processor 95. In this embodiment, the image capturing unit 80 includes the imaging lens driving module 1, the imaging lens system 2, the image sensor 83, the image stabilizer 84, the flash module 91 and the focus assist module 92.

When a user captures images of an object 96, the light rays converge in the image capturing unit 80 to generate an image(s), and the flash module 91 is activated for light supplement. The focus assist module 92 detects the object distance of the imaged object 96 to achieve fast auto focusing. The image signal processor 93 is configured to optimize the captured image to improve image quality. The light beam emitted from the focus assist module 92 can be either conventional infrared or laser. The display unit 94 can be a touch screen or have a physical shutter button. The user is able to interact with the display module 94 and the image software processor 95 having multiple functions to capture images and complete image processing. The image processed by the image software processor 95 can be displayed on the display module 94.

Figure 115:
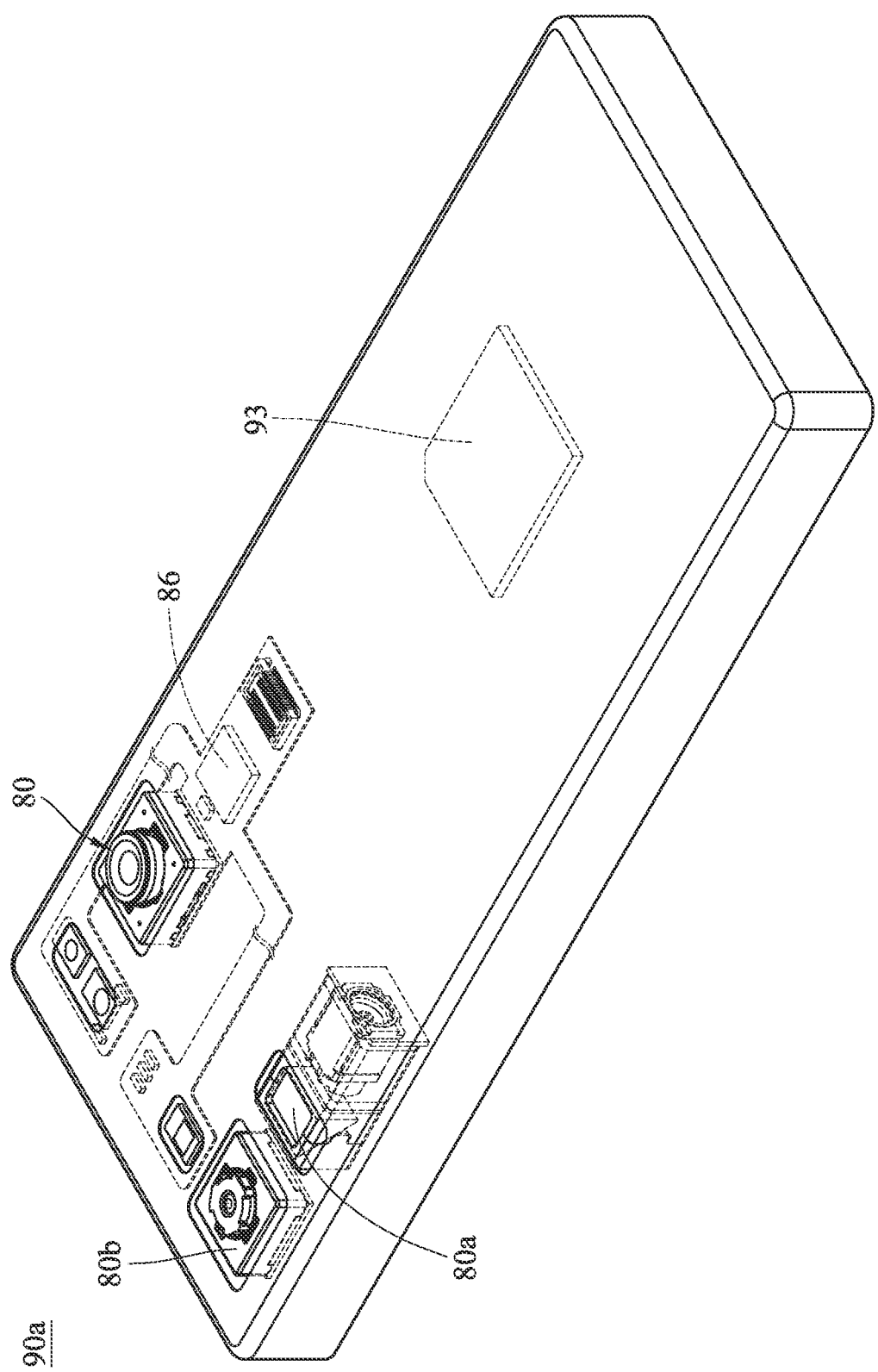
FIG. 115 is a perspective view of another electronic device according to one embodiment of the present disclosure.

The electronic device of the present disclosure is not limited to the number of image capturing units as described above. FIG. 115 is a perspective view of another electronic device according to one embodiment of the present disclosure. An electronic device 90a is similar to the electronic device 90, and the electronic device 90a further includes an image capturing unit 80a and an image capturing unit 80b. The image capturing unit 80, the image capturing unit 80a and the image capturing unit 80b all face the same direction and each has a single focal point. In addition, the image capturing unit 80, the image capturing unit 80a and the image capturing unit 80b have different fields of view (e.g., the image capturing unit 80a is a telephoto image capturing unit, the image capturing unit 80b is a wide-angle image capturing unit, and the image capturing unit 80 has a field of view ranging between the image capturing unit 80a and the image capturing unit 80b), such that the electronic device 90a has various magnification ratios so as to meet the requirement of optical zoom functionality. Furthermore, in this embodiment, the image capturing unit 80 further includes an expansion image signal processor 86.

When the image capturing unit 80 works with the telephoto image capturing unit 80a and wide-angle image capturing unit 80b, the expansion image signal processor 86 provides zoom functionality for images on the touch screen so as to meet image processing requirements for multiple image capturing units. The electronic device 90a equipped with the image capturing unit 80 has various modes of different photographing functions, such as zoom function, telephotography, multi-camera recording, selfie-optimized function, and high dynamic range (HDR) and 4K resolution imaging under low-light conditions.

The smartphone in this embodiment is only exemplary for showing the imaging lens driving module of the present disclosure installed in an electronic device, and the present disclosure is not limited thereto. The imaging lens driving module can be optionally applied to optical systems with a movable focus. Furthermore, the imaging lens driving module features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens driving module, comprising:
   a lens carrier, for holding an imaging lens system;
   a frame element, forming an interior space for the lens carrier to be disposed therein;
   a driving mechanism, for driving the lens carrier to move in a direction parallel to an optical axis of the imaging lens system, and the driving mechanism comprising:
      a metal elastic element, comprising:
         an outer fixing part, coupled to the frame element;
         an inner fixing part, located closer to the lens carrier than the outer fixing part to the lens carrier, and the inner fixing part being coupled to the lens carrier; and
         an elastic part, connected to the outer fixing part and the inner fixing part;
      a coil, fixed to the lens carrier; and
      a magnet assembly, disposed corresponding to the coil; and
   a metal conductive element, coupled to the lens carrier;
   wherein the metal elastic element further comprises an electrically connecting part and a compensating elastic part, the metal conductive element has a corresponsive surface, the corresponsive surface is disposed corresponding to and electrically connected to the electrically connecting part, and the compensating elastic part is connected to the electrically connecting part and the inner fixing part.

2. The imaging lens driving module of claim 1, wherein the electrically connecting part of the metal elastic element overlaps the corresponsive surface of the metal conductive element in the direction parallel to the optical axis.

3. The imaging lens driving module of claim 1, wherein a sectional area of the elastic part of the metal elastic element is A0, a minimum sectional area of the compensating elastic part of the metal elastic element is A1, and the following condition is satisfied:

$$0.05 < A1/A0 < 2.0.$$

4. The imaging lens driving module of claim 3, wherein the sectional area of the elastic part of the metal elastic element is A0, the minimum sectional area of the compensating elastic part of the metal elastic element is A1, and the following condition is satisfied:

$$0.1 < A1/A0 < 1.3.$$

5. The imaging lens driving module of claim 4, wherein the metal conductive element is disposed between the lens carrier and the electrically connecting part of the metal elastic element.

6. The imaging lens driving module of claim 1, wherein the electrically connecting part of the metal elastic element is in physical contact with the corresponsive surface of the metal conductive element.

7. The imaging lens driving module of claim 1, wherein a tapered air gap is between the electrically connecting part of the metal elastic element and the corresponsive surface of the metal conductive element.

8. A camera module, comprising:
   an imaging lens system;
   the imaging lens driving module of claim 1, wherein the imaging lens system is disposed on the lens carrier of the imaging lens driving module; and
   an image sensor, disposed on an image surface of the imaging lens system.

9. An electronic device, comprising:
   the camera module of claim 8.

10. An imaging lens driving module, comprising:
    a lens carrier, for holding an imaging lens system;
    a frame element, forming an interior space for the lens carrier to be disposed therein;
    a driving mechanism, for driving the lens carrier to move in a direction parallel to an optical axis of the imaging lens system, and the driving mechanism comprising:
       a metal elastic element, comprising:
          an outer fixing part, coupled to the frame element;
          an inner fixing part, located closer to the lens carrier than the outer fixing part to the lens carrier, and the inner fixing part being coupled to the lens carrier; and
          an elastic part, connected to the outer fixing part and the inner fixing part;
       a coil, fixed to the lens carrier; and
       a magnet assembly, disposed corresponding to the coil; and
    a metal conductive element, coupled to the lens carrier;

wherein the metal conductive element comprises an electrically connecting part and a compensating elastic part, the metal elastic element has a corresponsive surface, the corresponsive surface is disposed corresponding to and electrically connected to the electrically connecting part, and the compensating elastic part is connected to the electrically connecting part.

11. The imaging lens driving module of claim 10, wherein the electrically connecting part of the metal conductive element overlaps with the corresponsive surface of the metal elastic element in a direction parallel to the optical axis.

12. The imaging lens driving module of claim 11, wherein a sectional area of the elastic part of the metal elastic element is A0, a minimum sectional area of the compensating elastic part of the metal conductive element is A1, and the following condition is satisfied:

$0.1 < A1/A0 < 1.3$.

13. The imaging lens driving module of claim 12, wherein the metal elastic element is disposed between the lens carrier and the electrically connecting part of the metal conductive element.

* * * * *